United States Patent
Farajidana et al.

(10) Patent No.: US 9,402,273 B2
(45) Date of Patent: Jul. 26, 2016

(54) DRX WAKEUP RULE IN AN EICIC ENVIRONMENT

(71) Applicant: QUALCOMM Incorporated, San Diego, CA (US)

(72) Inventors: Amir Farajidana, San Diego, CA (US); Xiliang Luo, San Diego, CA (US); Alexei Yurievitch Gorokhov, San Diego, CA (US); Hisham A. Mahmoud, San Diego, CA (US); Keith William Saints, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 14/139,803

(22) Filed: Dec. 23, 2013

(65) Prior Publication Data

US 2015/0181641 A1    Jun. 25, 2015

(51) Int. Cl.
*H04W 76/04* (2009.01)
*H04W 24/08* (2009.01)
*H04W 52/02* (2009.01)

(52) U.S. Cl.
CPC .......... *H04W 76/048* (2013.01); *H04W 24/08* (2013.01); *H04W 52/0216* (2013.01)

(58) Field of Classification Search
CPC .................................................. H04W 76/048
USPC ........................................................ 370/311
See application file for complete search history.

(56) References Cited

U.S. PATENT DOCUMENTS

| 8,346,313 | B2 | 1/2013 | Tu |
| 8,411,605 | B2 | 4/2013 | Kim et al. |
| 2009/0073907 | A1 | 3/2009 | Cai |
| 2012/0083280 | A1 | 4/2012 | Liu et al. |
| 2012/0236736 | A1* | 9/2012 | Frank .......... H04W 24/04 370/252 |
| 2012/0309291 | A1* | 12/2012 | Sawai .......... H04B 7/15542 455/7 |
| 2013/0045770 | A1* | 2/2013 | Aschan .......... H04W 52/0216 455/522 |
| 2013/0176873 | A1 | 7/2013 | Ji et al. |
| 2013/0223271 | A1* | 8/2013 | Huang .......... H04W 48/16 370/252 |
| 2013/0286883 | A1* | 10/2013 | Kim .......... H04W 72/085 370/252 |

(Continued)

FOREIGN PATENT DOCUMENTS

JP      GB 2360911 A  * 10/2001 ........... H04B 7/0811

OTHER PUBLICATIONS

ISA/EPO, International Search Report and Written Opinion of the International Searching Authority, Int'l App. No. PCT/US2014/069682, Mar. 12, 2015, European Patent Office, Rijswijk, NL, 12 pgs.

(Continued)

*Primary Examiner* — Mark Rinehart
*Assistant Examiner* — Kenneth P Hunt
(74) *Attorney, Agent, or Firm* — Holland & Hart LLP

(57) ABSTRACT

Methods, systems, and devices are described for a UE to determine a DRX wakeup rule in an eICIC environment. A UE may identify a measurement period associated with reduced interference from one or more cells in a wireless communications network. The cells may be a serving cell or a neighbor cell. The measurement period may be identified based on eICIC data available to the UE. The eICIC data may be sent to the UE by a serving cell and/or determined by the UE. The UE may power up a wireless modem to perform a warm-up measurement of the serving cell during the identified measurement period prior to transitioning the UE to a DRX on state.

26 Claims, 18 Drawing Sheets

(56) References Cited

U.S. PATENT DOCUMENTS

2014/0293948 A1* 10/2014 Jiang .................. H04J 11/0056
    370/329
2015/0334589 A1* 11/2015 Yang .................. H04W 76/048
    370/252

OTHER PUBLICATIONS

IPEA/EPO, Second Written Opinion of the International Preliminary Examining Authority, Int'l App. No. PCT/US2014/069682, Dec. 15, 2015, European Patent Office, Rijswijk, NL, 6 pgs.

* cited by examiner

DRX WAKEUP RULE IN AN EICIC ENVIRONMENT

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless communications system may include a number of base stations, such as eNodeBs, that can support communication for a number of user equipments (UEs). A UE may communicate with a base station via downlink (DL) and uplink (UL). The downlink (or forward link) refers to the communication link from the base station to the UE, and the uplink (or reverse link) refers to the communication link from the UE to the base station. To conserve power, the UE may enter a discontinuous reception (DRX) mode with a base station. When the UE is in DRX mode, the UE may transition between a DRX on state, in which the wireless modem of the UE powers up to receive data, and a DRX off state in which where the UE enters a low power state and powers down at least a portion of its transceiver circuitry.

In DRX mode, it may be desirable to minimize power consumption while maximizing the achievable performance during DRX on states. In order to achieve a desired performance in DRX mode, the transceiver circuitry of the UE may wake-up for a duration of time (e.g. a subframe or a symbol) to perform warm-up measurements of channel parameters. In some situations, warm-up measurements taken at different times for the same channel(s) may vary because of changing interference levels. Waking up to perform warm-up measurements in time-intervals with high levels of interference may increase UE power consumption with no meaningful improvement in performance.

SUMMARY

The described features generally relate to one or more improved systems, methods, and/or apparatuses for DRX wakeup rule in a wireless communication system utilizing an enhanced inter-cell interference coordination (eICIC) scheme. A UE may leverage eICIC information about neighboring base stations to estimate the time intervals that can provide a good quality of channel estimation. Using this information, the UE may construct a wake-up schedule to perform warm-up measurements.

In a first set of illustrative examples, a method for wireless communication is provided. The method may include: identifying, by a user equipment (UE) associated with a serving cell, a measurement period associated with reduced interference from one or more neighboring cells in a wireless communications network, wherein the measurement period is identified based at least in part on enhanced inter-cell interference coordination (eICIC) data available to the UE; and powering up a wireless modem of the UE to perform a warm-up measurement of the serving cell during the identified measurement period prior to transitioning the UE to a discontinuous reception (DRX) on state. The method may also include receiving at least a portion of the eICIC data by the UE from the serving cell. Receiving the at least the portion of the eICIC data from the serving cell may include receiving a measurement subframe pattern associated with channel state information measurements of the serving cell.

In some aspects, the method may include determining at least a portion of the eICIC data by the UE. Determining at least the portion of the eICIC data by the UE may include determining an almost-blank signal (ABS) pattern associated with the one or more neighboring cells in the wireless communications network. The method of may include measuring at least one interference pattern from the one or more neighboring cells over a period of time, wherein the ABS pattern is based on the measured at least one interference pattern. The method may include refraining from performing warm-up measurements at the UE responsive to a substantial alignment between the DRX on state and at least one ABS subframe of the determined ABS pattern. Determining at least the portion of the eICIC data by the UE may include determining, during reception of a subframe, that the subframe includes an ABS subframe.

In some aspects, identifying the measurement period is based at least in part on one or more of a DRX offset associated with the UE, a DRX periodicity associated with the UE, a DRX on duration associated with the UE, a Doppler estimate measured by the UE, or an SNR estimate measured by the UE. The method may include identifying a dominant interfering cell of the UE, wherein identifying the measurement period is further based on a parameter of the dominant interfering cell. The parameter of the dominant interfering cell may include one or more of a reference signal location or a signal strength. Identifying the measurement period may be based at least in part on a location of the at least one measurement period relative to a DRX on-time of the UE.

In some aspects, the method may include identifying a reference signal collision among a plurality of the one or more neighboring cells in the wireless communications network, wherein identifying the measurement period may be based at least in part on the reference signal collision. The measurement period may be located within an almost-blank signal (ABS) subframe that immediately precedes a subframe associated with transitioning to the DRX on state.

In some aspects, one or more parameters measured by the UE for different cells may be compared, and identifying the measurement period may be further based on the comparison of the one or more parameters. The one or more parameters may include one or more of a Doppler evolution, a timing error, or a frequency error associated with each of the one or more neighboring cells.

In a second illustrative set of examples, an apparatus for wireless communications is provided. The apparatus may include a processor; memory in electronic communication with the processor; and instructions being executed by the processor. The instructions may be executed by the processor to: identify, by a user equipment (UE) associated with a serving cell, a measurement period associated with reduced interference from one or more neighboring cells in a wireless communications network, wherein the measurement period is identified based at least in part on enhanced inter-cell interference coordination (eICIC) data available to the UE; and power up a wireless modem of the UE to perform a warm-up measurement of the serving cell during the identified measurement period prior to transitioning the UE to a discontinuous reception (DRX) on state. The apparatus may also include instructions to receive at least a portion of the eICIC data by the UE from the serving cell. The instructions to receive at least the portion of the eICIC data from the serving cell may include further instructions to receive a measurement subframe pattern associated with channel state information measurements of the serving cell.

In some aspects, the apparatus may also include instructions to determine at least a portion of the eICIC data by the UE. The instructions to determine at least the portion of the eICIC data by the UE may include instructions to determine an almost-blank signal (ABS) pattern associated with the one or more neighboring cells in the wireless communications network. The apparatus may also including instructions to measure an interference pattern from the one or more neighboring cells over a period of time, wherein the ABS pattern is based on the measured interference pattern.

In some aspects, the apparatus may include instructions to refrain from performing warm-up measurements at the UE responsive to a substantial alignment between the DRX on state and at least one ABS subframe of the determined ABS pattern. The instructions to determine at least the portion of the eICIC data by the UE may include instructions to determine, during reception of a subframe, that the subframe includes an ABS subframe. The instructions to identify the measurement period may be based at least in part on one or more of a DRX offset associated with the UE, a DRX periodicity associated with the UE, a DRX on duration associated with the UE, a Doppler estimate measured by the UE, or an SNR estimate measured by the UE.

In some aspects, the apparatus may include instructions to identify a dominant interfering cell of the UE, wherein identifying the measurement period may be further based on a parameter of the dominant interfering cell. The parameter of the dominant interfering cell may include one or more of a reference signal location or a signal strength. Identifying the measurement period may be based at least in part on a location of the measurement period relative to a DRX on-time of the UE. The apparatus may include instructions to identify a reference signal collision among a plurality of the one or more neighboring cells in the wireless communications network, wherein identifying the measurement period may be based at least in part on the reference signal collision. The measurement period may be located within an almost-blank signal (ABS) subframe that immediately precedes a subframe associated with transitioning to the DRX on state.

In some aspects, the apparatus may include instructions to compare one or more parameters measured by the UE for different cells, and identifying the measurement period may be further based on the comparison of the one or more parameters. The one or more parameters may include one or more of a Doppler evolution, a timing error, or a frequency error associated with each of the one or more neighboring cells.

In a third set of illustrative examples, an apparatus for wireless communication is provided. The apparatus may include: means for identifying, by a user equipment (UE) associated with a serving cell, a measurement period associated with reduced interference from one or more neighboring cells in a wireless communications network, wherein the measurement period is identified based at least in part on enhanced inter-cell interference coordination (eICIC) data available to the UE; and means for powering up a wireless modem of the UE to perform a warm-up measurement of the serving cell during the identified measurement period prior to transitioning the UE to a discontinuous reception (DRX) on state. The apparatus may include means for receiving at least a portion of the eICIC data by the UE from the serving cell. The means for receiving at least the portion of the eICIC data from the serving cell may include means for receiving a measurement subframe pattern associated with channel state information measurements of the serving cell.

In some aspects, the apparatus may include means for determining at least a portion of the eICIC data by the UE. The means for determining at least the portion of the eICIC data by the UE may include means for determining an almost-blank signal (ABS) pattern associated with the one or more neighboring cells in the wireless communications network. The apparatus may include means for measuring an interference pattern from the one or more neighboring cells over a period of time, wherein the ABS pattern is based on the measured interference pattern. The apparatus may include means for refraining from performing warm-up measurements at the UE responsive to a substantial alignment between the DRX on state and at least one ABS subframe of the determined ABS pattern.

In some aspects, the means for determining at least the portion of the eICIC data by the UE may include means for determining, during reception of a subframe, that the subframe includes an ABS subframe. The means for identifying the measurement period may be based at least in part on one or more of a DRX offset associated with the UE, a DRX periodicity associated with the UE, a DRX on duration associated with the UE, a Doppler estimate measured by the UE, or an SNR estimate measured by the UE. The apparatus may include means for identifying a dominant interfering cell of the UE, wherein identifying the measurement period may be further based on a parameter of the dominant interfering cell. The parameter of the dominant interfering cell may include one or more of a reference signal location or a signal strength. The means for identifying the measurement period may be based at least in part on a location of the at least one measurement period relative to a DRX on-time of the UE.

In some aspects, the apparatus may include means for identifying a reference signal collision among a plurality of the one or more neighboring cells in the wireless communications network, wherein identifying the measurement period is based at least in part on the reference signal collision. The measurement period may be located within an almost-blank signal (ABS) subframe that immediately precedes a subframe associated with transitioning to the DRX on state.

In a fourth set of illustrative examples, a computer program product for wireless communication is provided. The computer program product may include a non-transitory computer-readable medium storing instructions executable by a processor. The instructions may be executable to: identify, by a user equipment (UE) associated with a serving cell, a measurement period associated with reduced interference from one or more neighboring cells in a wireless communications network, wherein the measurement period is identified based at least in part on enhanced inter-cell interference coordination (eICIC) data available to the UE; and power up a wireless modem of the UE to perform a warm-up measurement of the serving cell during the identified measurement period prior to transitioning the UE to a discontinuous reception (DRX) on state.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
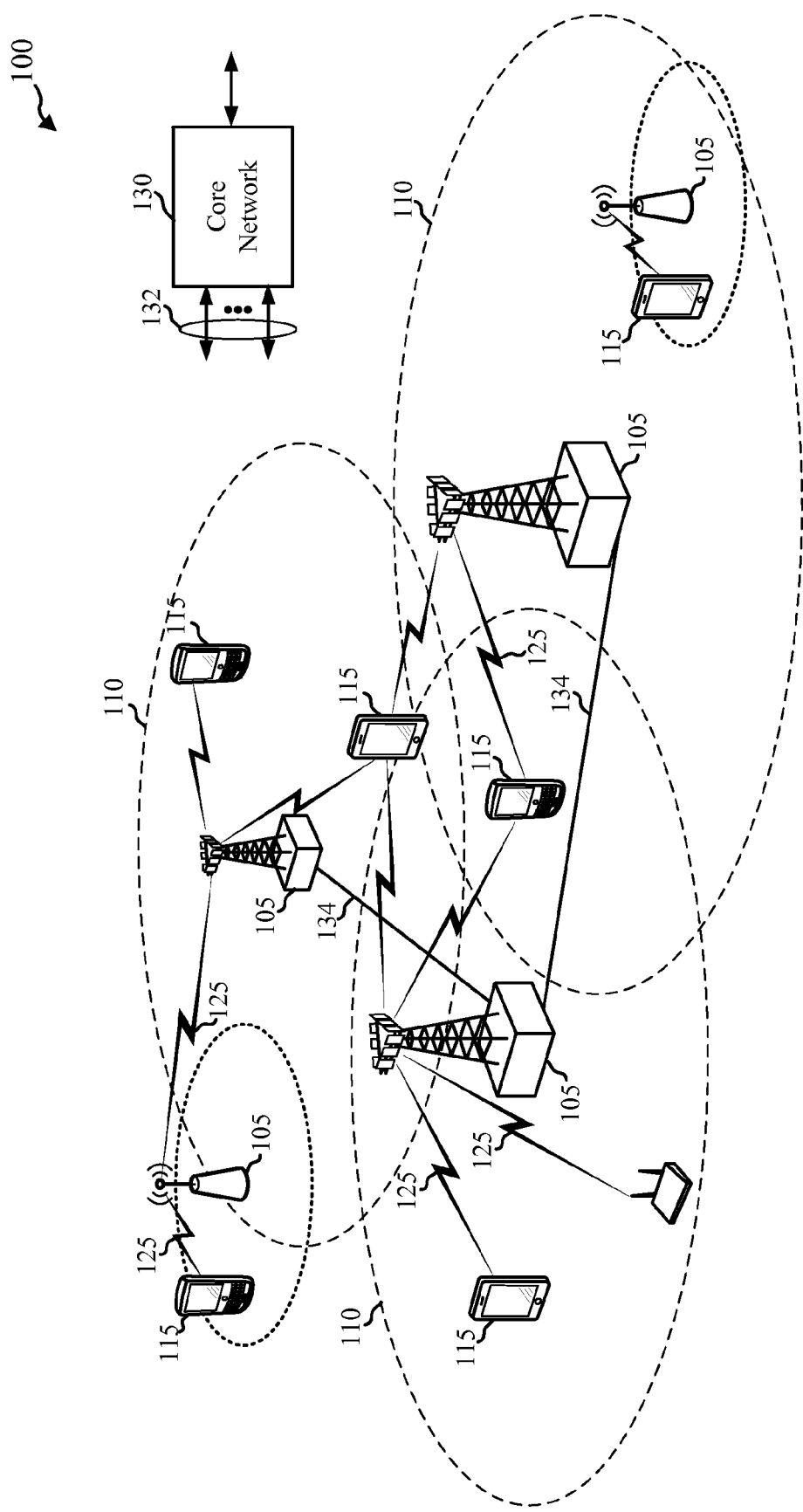
FIG. 1 shows a block diagram of an exemplary wireless communications system.

The present disclosure describes techniques for determining a DRX wakeup rule in a wireless communications system. A UE may be associated with a serving cell of the wireless communications network. The wireless communications network may be a heterogeneous network and may employ eICIC. The UE may identify at least one measurement period associated with reduced interference from one or more neighboring cells in the wireless communications network. The measurement period may be identified based at least in part on eICIC data available to the UE. At least a portion of the eICIC data may be provided to the UE and/or determined by the UE. The UE may power up a wireless modem of the UE to perform a warm-up measurement of the serving cell during the at least one identified measurement period prior to transitioning the UE to a DRX on state.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells or nodes) 105, user equipments (UEs) 115, and a core network 130. For the purposes of the present disclosure, the terms "cell," "base station," and "eNB" are used interchangeably. For the purposes of the present disclosure, the terms "UE" and "mobile device" are used interchangeably.

The base stations 105 may communicate with the UEs 115 under the control of a base station controller (not shown), which may be part of the core network 130 or the base stations 105 in various embodiments. Base stations 105 may communicate control information and/or user data with the core network 130 through backhaul 132. In certain embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective geographic coverage area 110. In some embodiments, a base station 105 may be referred to as a base transceiver station, a radio base station, an access point, a radio transceiver, a basic service set (BSS), an extended service set (ESS), a NodeB, eNodeB (eNB), a Home NodeB, a Home eNodeB, or some other suitable terminology. The coverage area 110 for a base station 105 may be divided into sectors making up only a portion of the coverage area (not shown). The system 100 may include base stations 105 of different types (e.g., macro, micro, and/or femto/pico base stations). There may be overlapping coverage areas for different technologies.

In certain embodiments, the system 100 is an LTE/LTE-A network. In LTE/LTE-A networks, the term evolved Node B (eNB) may be generally used to describe one or more of the base stations 105. The system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

As discussed, the system 100 may be a Heterogeneous LTE/LTE-A network. LTE/LTE-A contemplates many eNBs of various types (e.g., macro cells, pico/femto cells, etc.) and includes eICIC provisions to mitigate interference between such eNBs. Generally, eICIC provides for coordination between the eNBs and/or the core network 130 to avoid interfering transmissions. One aspect of eICIC in LTE Release 10, for example, is the use of almost blank signal (ABS) subframes in which an eNB 105 transmits nothing except the common reference signals used for measurements. In some cases, the eNB 105 may also transmit essential control information like synchronization, paging, or system information. Generally, an eNB 105 does not transmit any DL data during an ABS subframe. By coordinating the transmission of ABSs by the eNBs, UEs 115 may have periodic opportunities to measure channel conditions and parameters with substantially less interference from neighboring eNBs, thereby resulting in improved channel estimation.

The core network 130 may communicate with the base stations 105 via a backhaul 132 (e.g., 51, etc.). The base stations 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communications links 125 shown in the wireless communications system 100 may include uplink (UL) transmissions from a UE 115 to a base station 105, and/or downlink (DL) transmissions from a base station 105 to a UE 115. The downlink transmissions may also be called forward link transmissions while the uplink transmissions may also be called reverse link transmissions.

The UEs 115 are dispersed throughout the wireless communications system 100 and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like.

According to certain embodiments, a UE 115 may be a device configured to enter a DRX mode to save power. The DRX mode for the UE 115 may be coordinated between the UE 115, one or more eNBs 105, and/or the core network 130, and may include at least one DRX cycle. Each DRX cycle may include at least one DRX on period (also known as a DRX active period) where the UE transitions to a DRX on state and at least one DRX off period (also known as a DRX inactive period) where the UE 115 transitions to a DRX off state. During the DRX off state, the UE 115 may enter a low power mode by disabling one or more components (e.g., wireless modems). During the DRX on state, the UE 115 may enter an active mode where it turns on one or more components to receive signal(s) from one or more of the eNBs 105. In some aspects, the UE 115 may wake up prior to transitioning to the on state to perform warm-up measurements. Warm-up measurements may include monitoring channel parameters for a serving eNB 105 and possibly interfering eNBs. In some situations, the estimation quality of channel parameters can be different based on observations collected at different time-intervals because of varying levels of interference in time. In one scenario, in the context of a heterogeneous network deployment, if the UE 115 is served by a Pico cell, estimation quality in subframes used for Macro cell transmission can be much worse than subframes in which Macro cell is not transmitting. Good quality of channel estimate plays a substantial role in control channel (e.g., PDCCH/PHICH/PCFICH) demodulation accuracy when transitioning from a DRX off state to a DRX on state. The quality of channel estimate may hinge on the amount of interference present during warm-up measurements. Waking up during time-intervals with high levels of interference to perform warm-up measurements may increase UE power consumption without improving UE performance or efficiency.

In some examples, a UE 115 may identify a measurement period associated with reduced interference from one or more neighboring cells. During the measurement period, the UE 115 may warm/power up one or more components to monitor the channel conditions for one or more of the eNBs 105 of the network. The measurement period may be identified based on eICIC data available to the UE 115. The UE 115 may be configured to independently determine at least a portion of the eICIC data associated with the wireless communications network. Alternatively or additionally, the UE 115 may be configured to receive at least a portion of the eICIC data associated with the wireless communications network from a serving eNB 105, for example. The eICIC data may include information indicative of the DL transmission scheduling for one or more eNBs 105 of the network. In some aspects, the eICIC data may include data indicative of an ABS schedule for one or more of the eNBs 105. As such, the UE 115 may, based on the eICIC data, be configured to determine a DRX wakeup schedule that at least partially corresponds to the transmission of one or more ABS subframes by neighboring eNBs in the time domain. Alternatively or additionally, the UE 115 may determine a DRX wakeup schedule that at least partially corresponds to periods of reduced interference from one or more eNBs 105.

The UE 115 may power up one or more wireless modems to perform a warm-up measurement during the identified measurement period. The UE 115 may perform the warm-up measurement for a serving cell prior to transitioning the UE 115 to a DRX on state to receive data and/or control information from the serving cell. The UE 115 may then transition to the DRX off state to conserve power and wait until the next scheduled DRX on state or measurement period.

Figure 2:
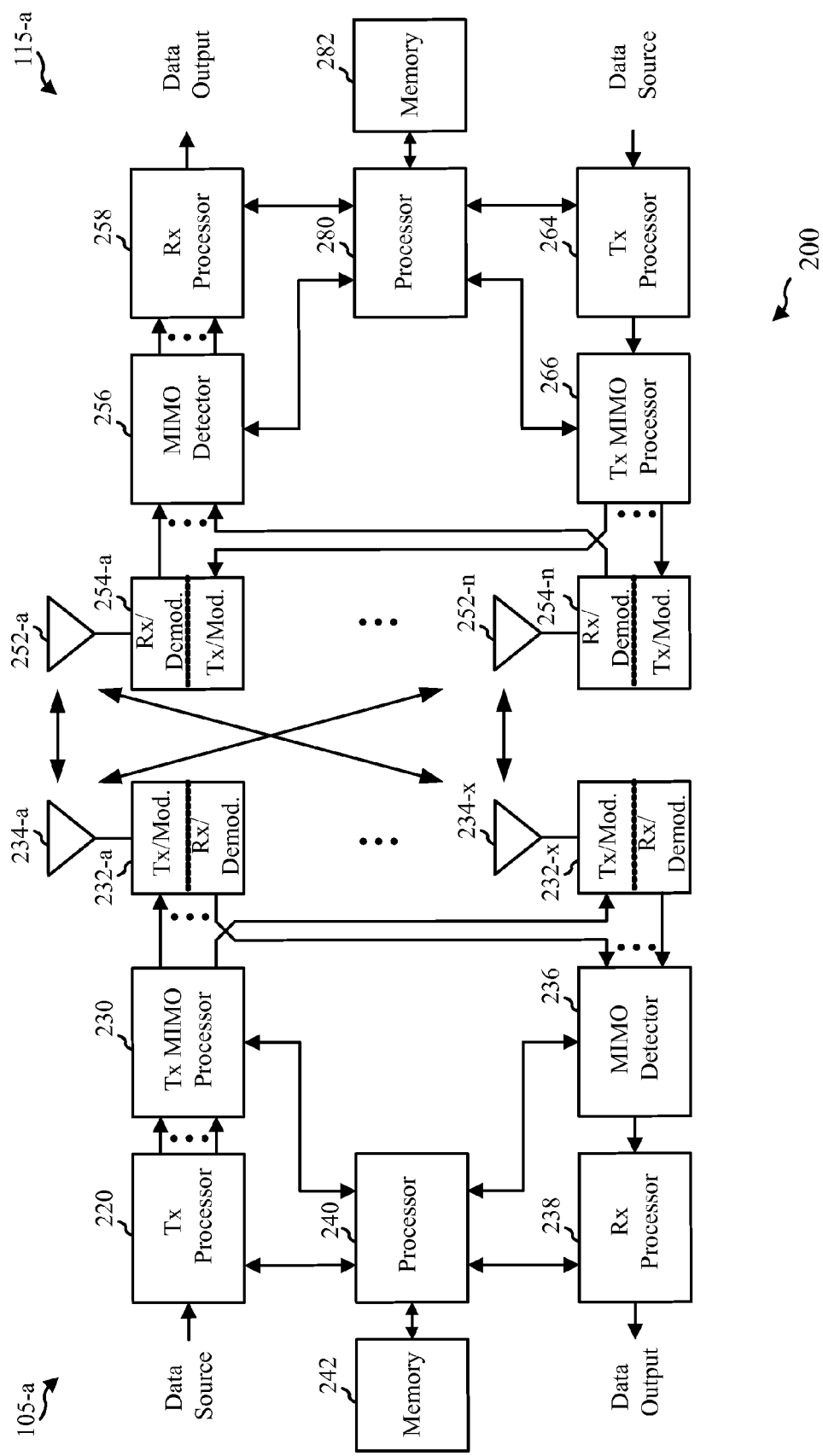
FIG. 2 shows a block diagram of an exemplary wireless communications system.

FIG. 2 is a block diagram conceptually illustrating a design of a wireless communications system 200 including a base station 105-a and a UE 115-a. This system 200 may illustrate aspects of the system 100 of FIG. 1. For example, the UE 115-a may be an example of one or more of the UEs 115 of FIG. 1, and the base station 105-a may be an example of one or more of the base stations of FIG. 2. The base station 105-a may be equipped with base station antennas 234-a through 234-x, where x is a positive integer, and the UE 115-a may be equipped with UE antennas 252-a through 252-n, where n is a positive integer. In the system 200, the base station 105-a may be able to send data over multiple communication links at the same time. Each communication link may be called a "layer" and the "rank" of the communication link may indicate the number of layers used for communication. For example, in a 2×2 MIMO system where base station 105-a transmits two "layers," the rank of the communication link between the base station 105-a and the UE 115-a is two.

At the base station 105-a, a base station transmit processor 220 may receive data from a data source and control information from a base station controller/processor 240. The control information may be for the PBCH, PCFICH, PHICH, PDCCH, etc. The base station transmit processor 220 may process the data (e.g., encode and symbol map) and control information to obtain data symbols and control symbols, respectively. The base station transmit processor 220 may also generate reference symbols and a cell-specific reference signal. A base station transmit (TX) MIMO processor 230 may perform spatial processing (e.g., precoding) on data symbols, control symbols, and/or reference symbols, if applicable, and may provide output symbol streams to the base station modulator/demodulators 232-a through 232-x. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink (DL) signal. In one example, DL signals from base station modulator/demodulators 232-a through 232-x may be transmitted via the base station antennas 234-a through 234-x, respectively.

At the UE 115-a, the UE antennas 252-a through 252-n may receive the DL signals from the base station 105-a and may provide the received signals to the UE modulator/demodulators 254-a through 254-n, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulator/demodulators 254-a through 254-n, perform MIMO detection on the received symbols if applicable, and provide detected symbols. A UE receive processor 258 may process (e.g., demodulate, deinterleave, and decode) the detected symbols, providing decoded data for the UE 115-a to a data output, and provide decoded control information to a UE processor 280, or UE memory 282.

On the uplink (UL), at the UE 115-a, a UE transmit processor 264 may receive and process data from a data source. The UE transmit processor 264 may also generate reference symbols for a reference signal. The symbols from the UE transmit processor 264 may be precoded by a UE transmit MIMO processor 266 if applicable, further processed by the UE modulator/demodulators 254-a through 254-n (e.g., for SC-FDMA, etc.), and be transmitted to the base station 105-a in accordance with the transmission parameters received from the base station 105-a. At the base station 105-a, the UL signals from the UE 115-a may be received by the base station antennas 234, processed by the base station modulator/demodulators 232, detected by a base station MIMO detector 236 if applicable, and further processed by a base station receive processor 238. The base station receive processor 238 may provide decoded data to a data output and to the base station processor 240. The components of the UE 115-a may, individually or collectively, be implemented with one or more Application Specific Integrated Circuits (ASICs) adapted to perform some or all of the applicable functions in hardware. Each of the noted modules may be a means for performing one or more functions related to operation of the system 200. Similarly, the components of the base station 105-a may, individually or collectively, be implemented with one or more ASICs adapted to perform some or all of the applicable functions in hardware. Each of the noted components may be a means for performing one or more functions related to operation of the system 200.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

In one configuration, the UE 115-a may include means for determining a DRX wakeup rule for a wireless communications system by determining a measurement period to perform channel condition measurements prior to transitioning to a DRX on state. The UE 115-*a* may also include means for determining the measurement period based on eICIC data that may be sent to the UE 115-*a* by a serving base station (e.g., base station 105-*a*) and/or determined by the UE 115-*a* independently. The UE 115-*a* may further include means for powering up the UE modulator/demodulators 254 and/or other components of the UE modulator/demodulator 254 to perform a warm-up measurement of the serving base station during the identified at least one measurement period prior to transitioning to a DRX on state. In one aspect, the aforementioned means may be the UE controller/processor 280, the UE memory 282, the UE transmit processor 264, UE receiver processor 258, the UE modulator/demodulators 254, and the UE antennas 252 of the UE 115-*a* configured to perform the functions recited by the aforementioned means.

In certain configurations, the UE 115-*a* may determine the wake up period associated with reduced interference from one or more neighboring cells of the network. The serving base station 105-*a* may provide signaling to the UE 115-*a* indicative of the eICIC data for the network. The signaling may be provided to the base station 105-*a* from higher layers (e.g., the core network 130) and/or from neighboring base stations. The UE 115-*a* may power up the UE modulator/demodulators 254 to perform the warm-up measurement of the serving base station 105-*a* during the determined measurement period prior to transitioning the UE 115-*a* to a DRX on state.

Figure 3:
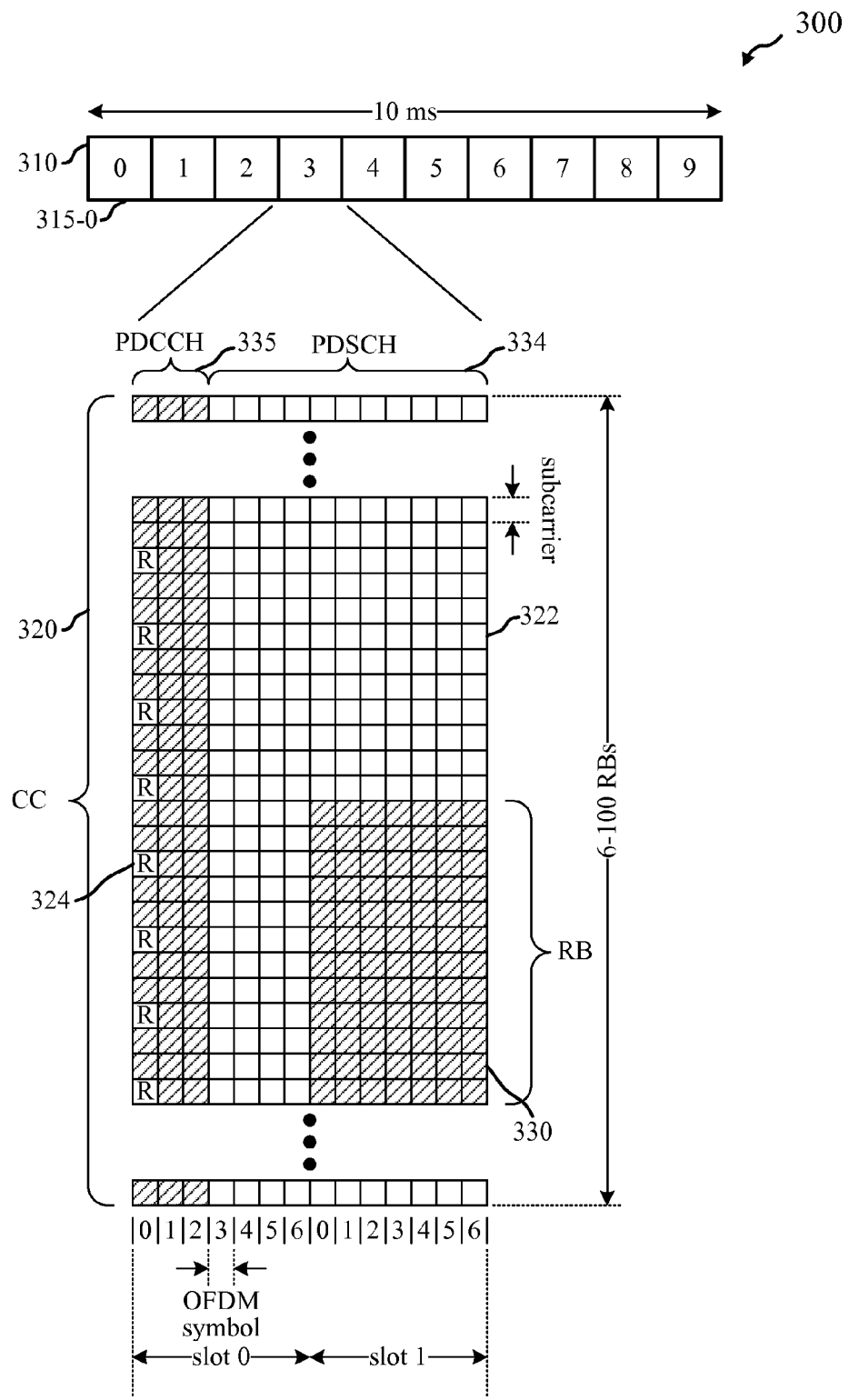
FIG. 3 shows an exemplary downlink frame structure in a wireless communications system.

FIG. 3 is a diagram illustrating an example of a frame structure 300 that may be used in a wireless communication system, including the wireless communications systems 100 and/or 200, described above with reference to the previous Figures. For example, the frame structure 300 may be used in LTE/LTE-A or similar systems. A frame 310 (10 ms) may be divided into 10 equally sized sub-frames (e.g., subframe 315-0, etc.). Each sub-frame may include two consecutive time slots. An OFDMA component carrier 320 may be illustrated as a resource grid representing two time slots. The resource grid may be divided into multiple resource elements 322.

In LTE/LTE-a, a resource block 330 may contain 12 consecutive subcarriers in the frequency domain and, for a normal cyclic prefix in each OFDM symbol, 7 consecutive OFDM symbols in the time domain, or 84 resource elements. Some of the resource elements, designated R (e.g., 324), may include DL reference signals (DL-RS). The DL-RS may include Cell-specific RS (CRS) (also sometimes called common RS) and UE-specific RS (UE-RS). UE-RS may be transmitted only on the resource blocks upon which the corresponding physical DL shared channel (PDSCH) 334 is mapped. The number of bits carried by each resource element may depend on the modulation scheme. Thus, the more resource blocks that a UE receives and the higher the modulation scheme, the higher the data rate may be for the UE. A resource assignment granted to a UE may include a subset of the available resource blocks 330. Depending on the modulation scheme, a resource assignment granted to a UE including a subset of the available resource blocks.

As illustrated in FIG. 3, a physical downlink control channel (PDCCH) 335 is generally time-division multiplexed with PDSCH 334 and generally is fully distributed within the entire bandwidth of the component carrier 320 within a first region of each subframe 315. In the example illustrated in FIG. 3, PDCCH 335 takes up the first three symbols of the subframe 315. PDCCH 335 may have more or fewer symbols as is appropriate based on the component carrier bandwidth and amount of control information for the subframe 315. The PHICH and/or PCFICH channels may be found in the first symbol of PDCCH 335 (not shown).

Wireless communications systems 100 and/or 200 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

Figure 4:
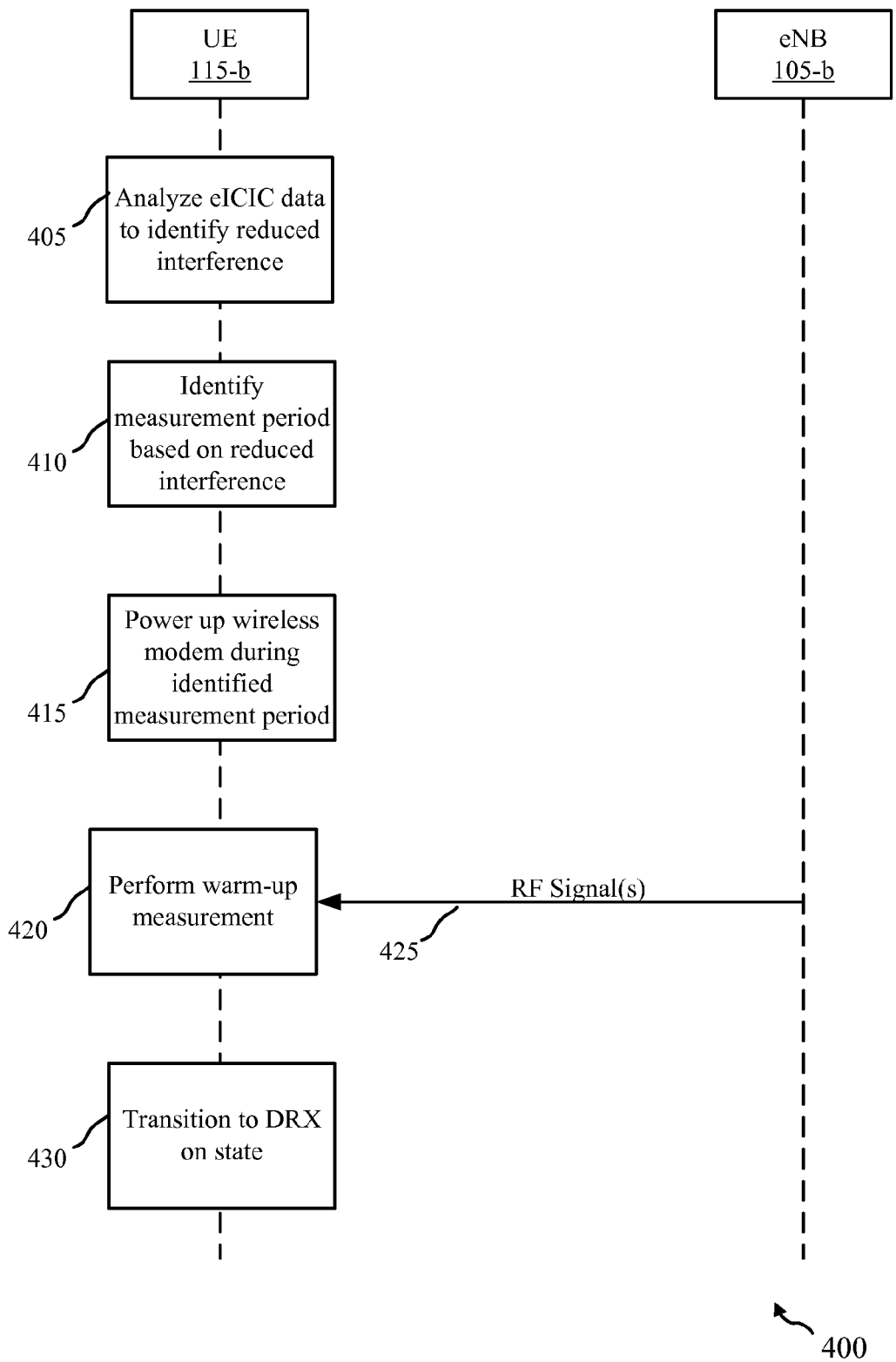
FIG. 4 shows a block diagram conceptually illustrating an example of communications between an eNB and a UE, in accordance with an aspect of the present disclosure.

FIG. 4 is a block diagram conceptually illustrating an example of communications between an eNB 105-*b* and a UE 115-*b*, in accordance with an aspect of the present disclosure. The UE 115-*b* may be an example of one or more of the UEs 115 described in the previous Figures and the eNB 105-*b* may be an example of one or more of the base stations 105 described in the previous figures. Generally, FIG. 4 illustrates a process 400 for determining a DRX wakeup rule in an eICIC environment by the UE 115-*b*.

At block 405 the UE 115-*b* may analyze eICIC data to identify reduced interference. For example, the UE 115-*b* may analyze the eICIC data to determine a period prior to the beginning of a DRX on state that has reduced interference with respect to other periods. The reduced interference period may correlate to periods of reduced transmissions by the eNB 105-*b*, e.g., periods where the eNB 105-*b* has no data to transfer and/or when the eNB 105-*b* will be transmitting an ABS subframe. At block 410, the UE 115-*b* may identify a measurement period based on the reduced interference. The UE 115-*b* may identify the measurement period associated with reduced interference that is before or immediately precedes a scheduled DRX on state of the UE 115-*b*. The UE 115-*b* may identify the measurement period to wake-up for a duration of time (e.g. a subframe, a symbol) and monitor channel parameters for the eNB 105-*b* and possibly other interfering eNBs.

At block 415, the UE 115-*b* may power up the wireless modem during the identified measurement period. In some aspects, the UE 115-*b* may warm-up the wireless modem immediately prior to the identified measurement period. At block 420, the UE 115-*b* performs the warm-up measurement and measures one or more RF signals at block 425 from the eNB 105-*b*. Based on the measured RF signals, the UE 115-*b* may determine the channel parameters or conditions of the eNB 105-*b*. Although not shown in FIG. 4, it is to be understood that the UE 115-*b* may also measure signals from other eNBs at 420 to identify an interfering eNB. At block 430, the UE 115-*b* may transition to a DRX on state in accordance with the DRX mode.

Figure 5:
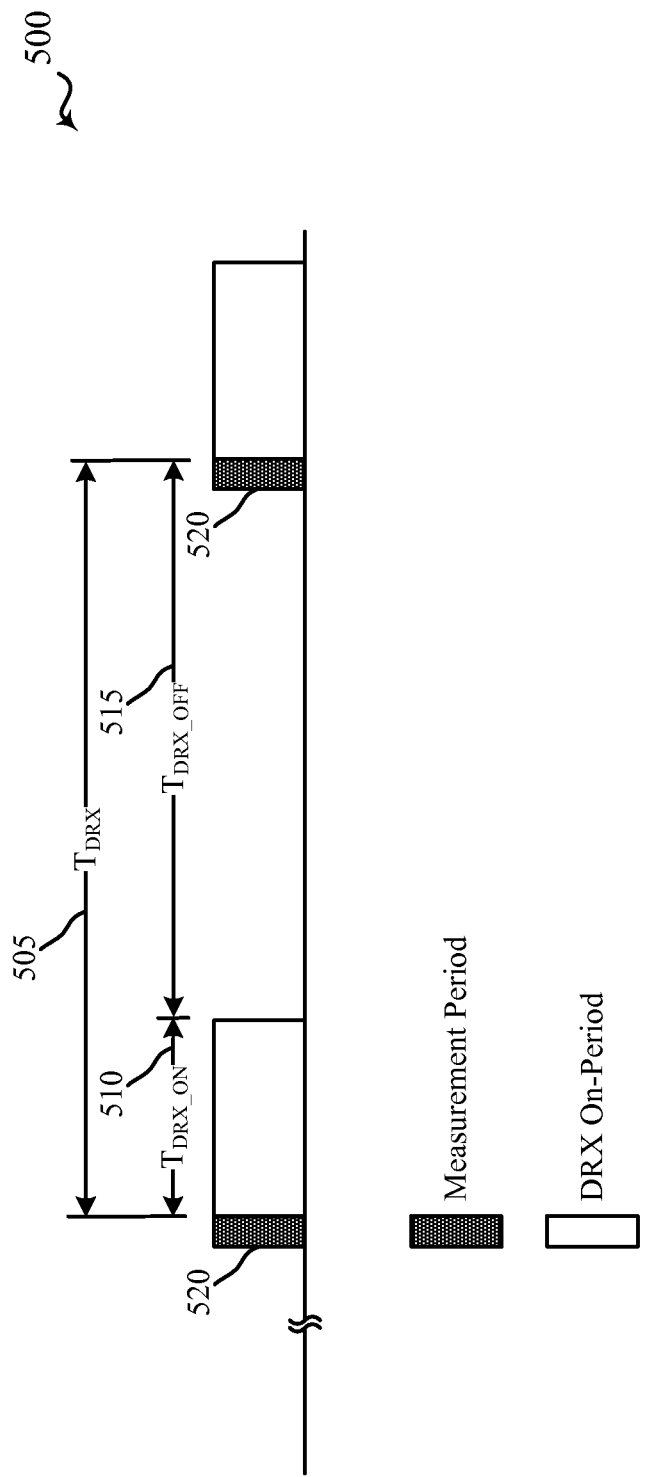
FIG. 5 shows a block diagram conceptually illustrating a DRX mode, in accordance with an aspect of the present disclosure.

FIG. 5 shows a block diagram conceptually illustrating a DRX mode 500, in accordance with an aspect of the present disclosure. Aspects of the DRX mode 500 may be implemented by the UEs 115 and/or by the base stations 105 discussed above with respect to the previous Figures. The DRX mode 500 generally permits a low power saving mode for a UE and may include a $T_{DRX}$ 505 that generally defines the cycle or periodicity of the DRX mode 500. The $T_{DRX}$ 505 may include a $T_{DRX\_ON}$ 510 and a $T_{DRX\_OFF}$ 515. The $T_{DRX\_ON}$ 510 corresponds to a DRX on state where the UE powers up one or more components to receive data and/or control information from a serving base station. The $T_{DRX\_OFF}$ 515 corresponds to a DRX off state where the UE powers down one or more components to conserve power.

As discussed, in DRX mode the UE may wake-up for a period of time and monitor channel parameters for serving cell and possibly interfering cells. This period illustrated in FIG. 5 as the measurement period 520. In some situations, the estimation quality of channel parameters can be different based on observations collected at different time-intervals. In the context of a heterogeneous network deployment, if the UE is served by a pico cell, estimation quality in subframes used for macro cell transmission can be much worse than subframes in which the macro cell is not transmitting. It can be appreciated that sufficient quality of channel estimate is needed for PDCCH/PHICH/PCFICH demodulation when transitioning from the DRX off state. Accordingly, the DRX mode 500 includes the measurement period 520 immediately adjacent the UE transitioning to the DRX on state.

Figure 6A:
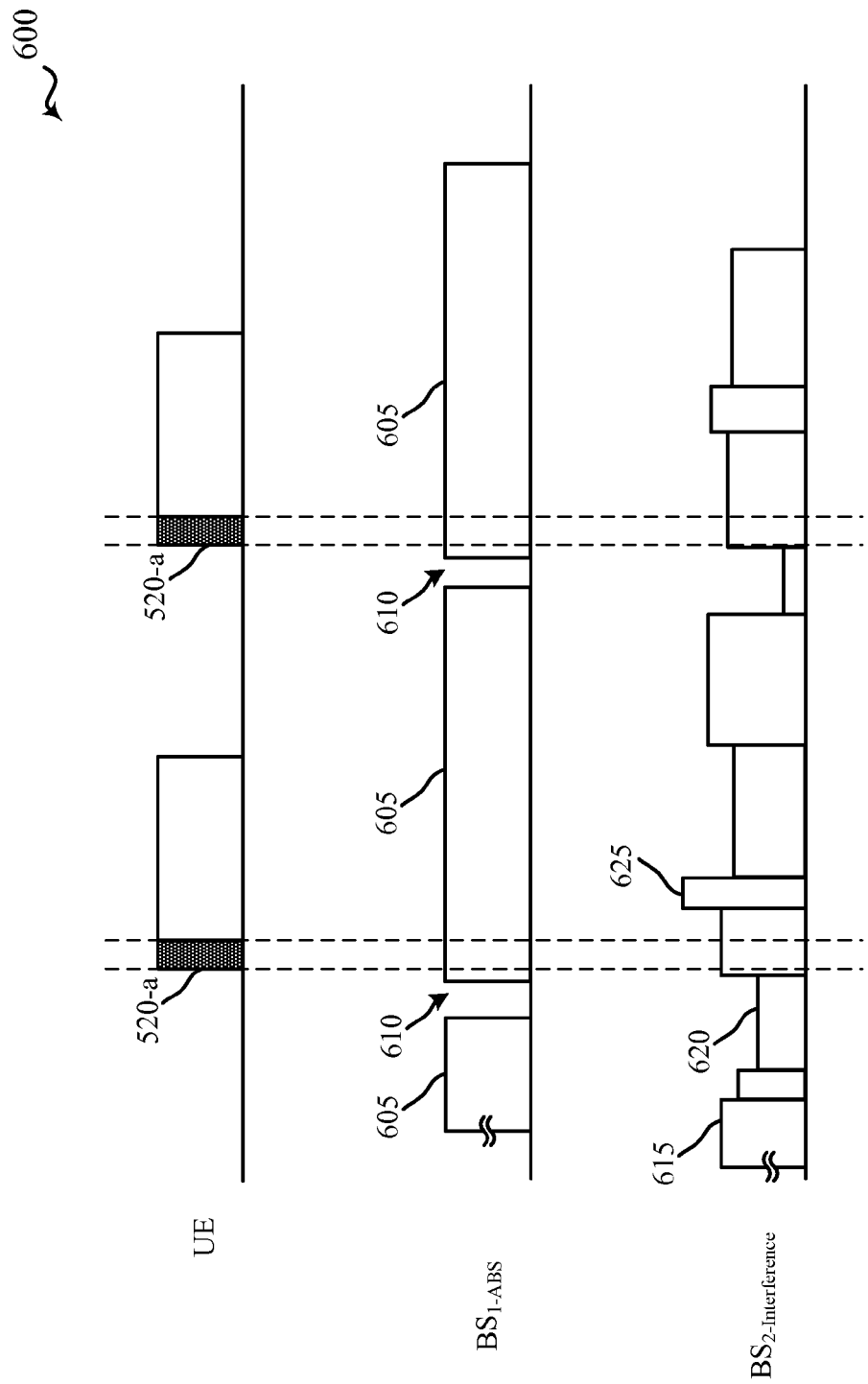
FIG. 6A shows a block diagram conceptually illustrating a DRX mode in relation to interference signals, in accordance with an aspect of the present disclosure.

FIG. 6A shows a block diagram 600 conceptually illustrating a DRX mode in relation to interference signals, in accordance with an aspect of the present disclosure. Aspects of the DRX mode may be implemented by the UEs 115 and/or by the base stations 105 discussed above with respect to the previous Figures. Generally, FIG. 6A illustrates the undesirable situation where the measurement period 520-a occurs during periods of increased interference. During the measurement period 520-a, the UE powers up one or more wireless modems to perform the warm-up measurement, i.e., to determine channel parameters for a serving base station to ensure proper demodulation of the signals during the DRX on state. As can be seen, during the measurement period 520-a, the UE receives and measures signals from two base stations, denoted as $BS_{1\text{-}ABS}$ and $BS_{2\text{-}Interference}$. Although FIG. 6A only shows the UE receiving signals from two base stations, it can be appreciated that the UE would generally receive and measure signals from many and, perhaps all of the base stations of the wireless communications network during the measurement period 520-a. In some examples, the $BS_{1\text{-}ABS}$ may be the serving base station of the UE and $BS_{2\text{-}Interference}$ may be an interfering base station.

As illustrated in FIG. 6A, $BS_{1\text{-}ABS}$ includes one or more transmission periods 605 (e.g., frames, subframes, symbols) and includes one or more ABS subframes 610 where only a RS is transmitted, for example. $BS_{2\text{-}Interference}$ includes transmission periods 615, 620, and 625 of differing power levels that, from the perspective of the UE, correspond to different levels of interference. For instance, transmission period 620 has a lower power level (interference level for the UE) than transmission period 615 and/or 625. Similarly, transmission period 615 has a lower power level than transmission period 625.

As can be seen from FIG. 6A, generically assigning the measurement period 520-a immediately prior to the corresponding DRX on state, as is often the case, may result in the UE waking up in time-intervals with a high level of interference that will increase the power consumption with no meaningful performance improvement or guarantee of success.

Figure 6B:
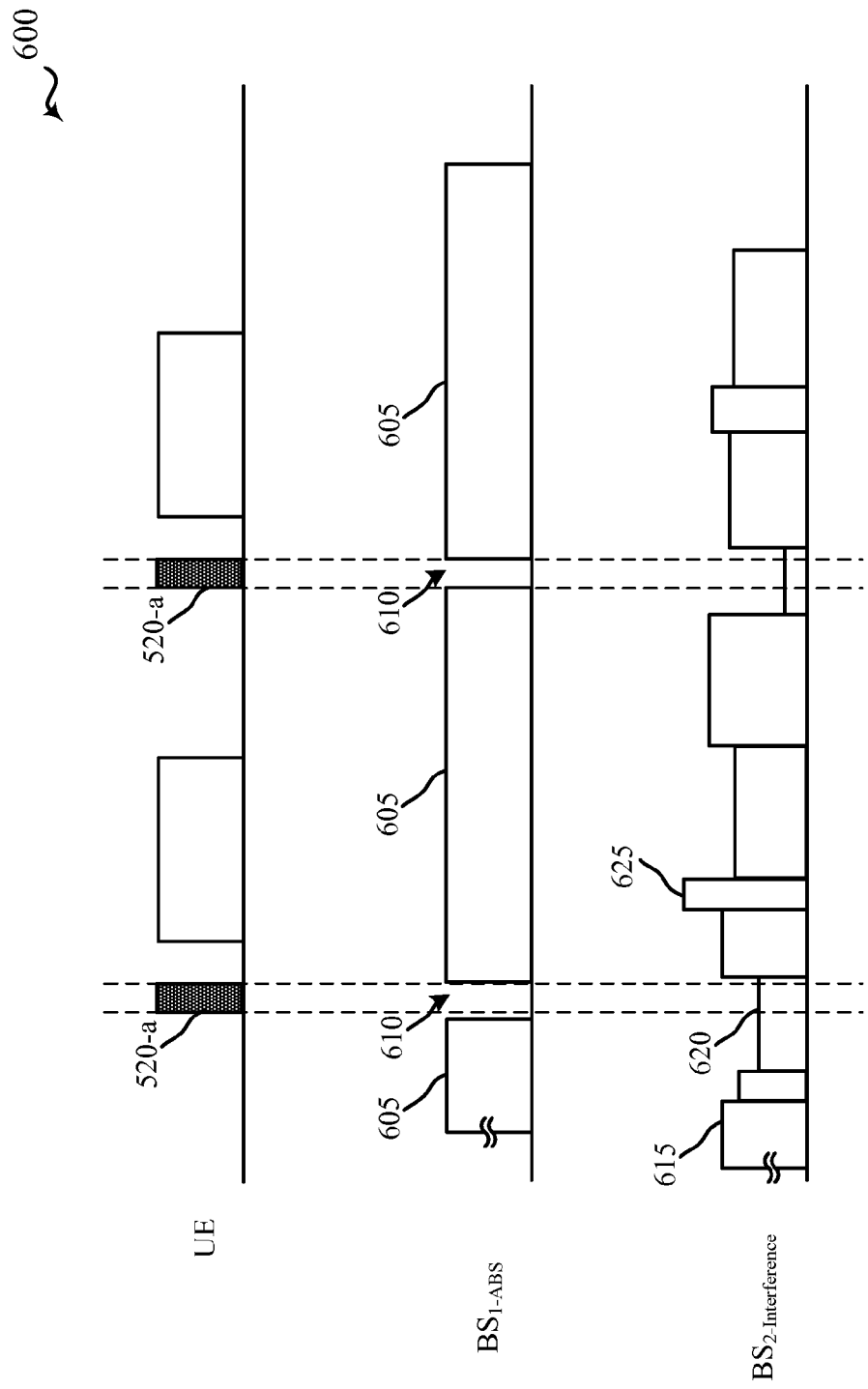
FIG. 6B shows a block diagram conceptually illustrating a DRX mode in relation to interference signals, in accordance with an aspect of the present disclosure.

FIG. 6B shows a block diagram 600 conceptually illustrating the DRX mode in relation to interference signals, in accordance with an aspect of the present disclosure. Aspects of the DRX mode may be implemented by the UEs 115 and/or by the base stations 105 discussed above with respect to the previous Figures. Generally, FIG. 6B illustrates the situation where the UE determines the measurement period 520-a associated with periods of reduced interference. The UE may have eICIC data available for the wireless communications network.

The eICIC data may include information indicative of the time-intervals that can provide a good quality of estimation in a dynamic or semi-static fashion. Good quality of estimation may reflect or take into account the UE processing, including interference cancellation. The UE may incorporate knowledge of the time-intervals associated with a good quality of in constructing a wake-up schedule for the measurement period 520-a.

For example, the UE may observe patterns in interference measured from neighboring base stations/cells over a period of time. Alternatively, the UE may receive an indication from the network regarding the transmission power, scheduling, and/or ABS patterns of neighboring cells. In one aspect, the UE may determine that subframes falling within a first pattern tend to have high amounts of interference from neighboring cells. These subframes may be less useful for channel estimation, and the UE may construct a wake-up schedule for performing warm-up measurements on subframes outside of the first observed pattern. Additionally or alternatively, the UE may observe that subframes falling within a second pattern tend to have low amounts of interferences from neighboring cells (e.g., the UE may observe a pattern of ABS subframes and/or lower transmission power from one or more neighboring cells). In this case, the UE may construct a wake-up schedule for the measurement period 520-a such that warm-up measurements are performed during subframes falling within the second pattern.

An additional or alternative factors that may be taken into account by the UE when constructing the wake-up schedule for warm-up measurements is that of the periodicity and duration of DRX on or off periods. For example, for a longer DRX off state, the UE may prioritize measurement opportunities that are closer to the start of the next DRX on state. This prioritization may be counterbalanced by the predicted amount of interference associated each measurement opportunity.

An additional or alternative factor that may be taken into account by the UE when constructing the wake-up schedule is that of whether reference signals of one or more interfering neighbor cells collide with the reference signals of a serving cell for the UE. For example, if the UE determines by, observation and/or network signaling, that the reference signals of a dominant or strong interfering cell collide with the reference signals of the serving cell, the UE may determine that the interference or ABS patterns of the interfering cell need not be taken into consideration. This determination may be based on the UE's ability to leverage the reference signals of the interfering cell to calculate and subtract or cancel the contribution of the interfering cell during channel estimation. Thus, the UE may instead construct the wake-up schedule for warm-up measurements based on ABS or transmission schedules associated with one or more weaker interfering cells, or based on what measurement opportunities would provide more power savings to the UE.

Additional or alternative factors that may be taken into account by the UE when constructing the wake-up schedule may include Doppler and signal-to-noise estimates for one or more interfering cells. These estimates may allow the UE to determine strong interfering cells and predict the movement of the UE with respect to the strong interfering cells. The ABS and interference schedules for the strongest interferers may then have more influence or weight than weaker interferers in the construction of the wake-up schedule by the UE.

In certain examples, the UE may compare one or more parameters (e.g., timing error, frequency error, Doppler estimates) for different cells, and the wake-up schedule for warm-up measurements (including at least one measurement period associated with reduced interference from neighboring cells) may be identified based at least in part on this comparison. For example, the UE may determine that the timing error, frequency error, or Doppler evolution over time for different cells is closely correlated. The UE may then take that information into account when identifying strong and weak interfering cells and predicting the movement of the UE with respect to the cells. The UE may construct a wake-up schedule for the warm-up measurements according to this predicted movement.

In some aspects, the eICIC data may include data indicative of dominant interfering cells and their parameters, such as reference signal locations, and whether they are colliding with a serving cell and their power relative to serving cell UE.

For example, the UE may track transmissions from $BS_{1\text{-}ABS}$ and $BS_{2\text{-}Interference}$ over time and/or receive network signaling from one or more base stations to become aware of when $BS_{1\text{-}ABS}$ will transmit an ABS subframe 610 and aware of when $BS_{2\text{-}Interference}$ will be transmitting at a lower power level (i.e., reduced interference) during transmission period 620. As such, the UE may identify at least one measurement period 520-a associated with reduced interference from the cells associated with these base stations (e.g., a period in which a lower level of interference from $BS_{2\text{-}Interference}$ collides with one or more ABS frames from $BS_{1\text{-}ABS}$) in the wireless communications network. The UE may power up a wireless modem of the UE to perform warm-up measurements of the cells during the at least one measurement period 520-a prior to transitioning the UE to the DRX on state.

Additionally or alternatively, the UE may determine (based on observation and/or signaling from the network) that an ABS from one or more of the base stations coincides with the DRX on period of the UE, in which case the UE may choose to perform channel estimations during the DRX on period, and consequently reduce or eliminate the amount or degree of warm-up measurements performed during the DRX off period.

Additionally or alternatively, the UE may determine (based on observation and/or signaling from the network) that an ABS from one or more of the base stations occurs right before the beginning of the DRX on period of the UE, in which case the UE may construct the wake-up schedule such that the UE performs warm-up measurements and channel estimates one subframe prior to the DRX on period. The UE may then remain awake for the DRX on period.

Figure 7:
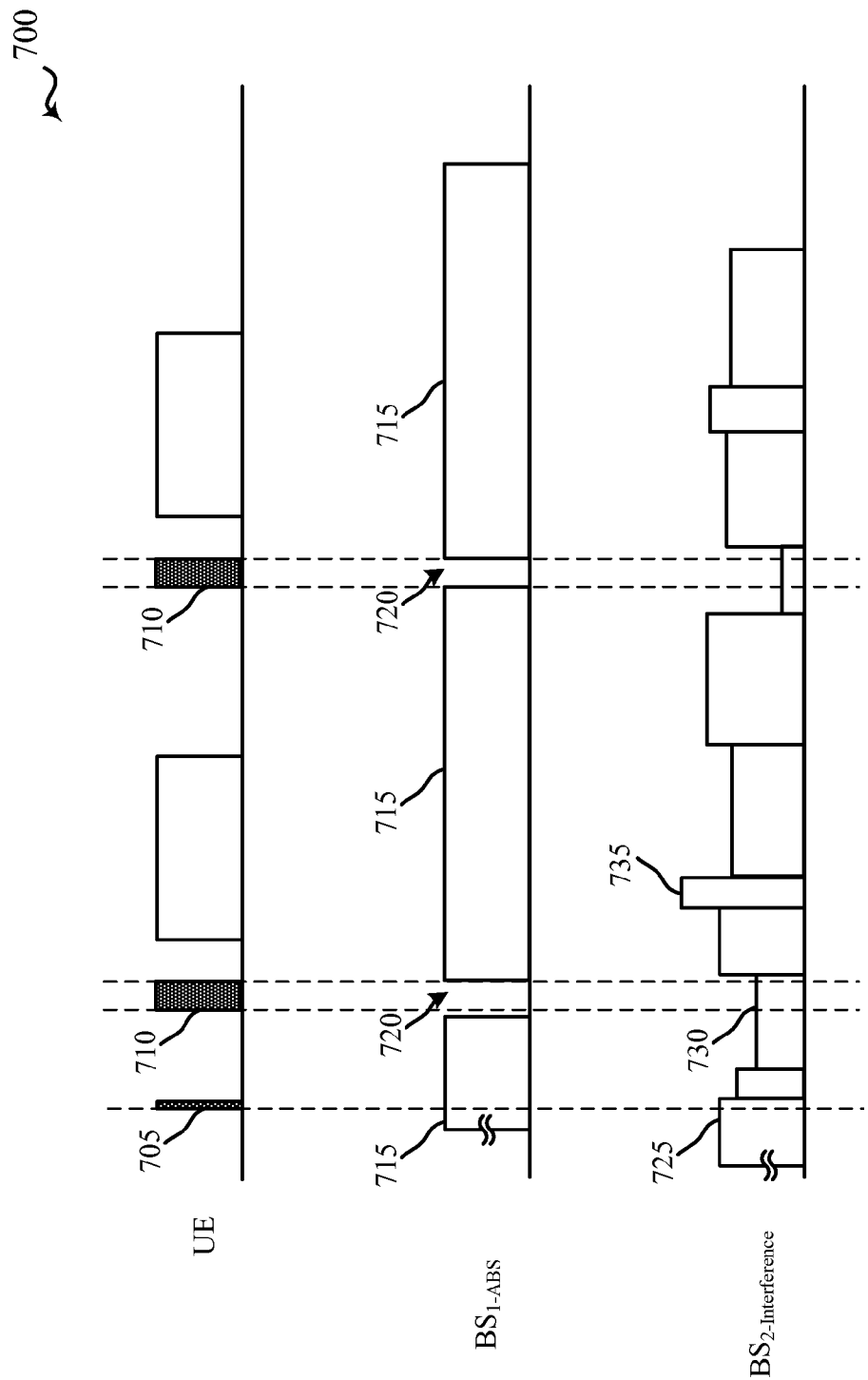
FIG. 7 shows a block diagram conceptually illustrating a DRX mode in relation to interference signals, in accordance with an aspect of the present disclosure.

FIG. 7 shows a block diagram 700 conceptually illustrating a DRX mode in relation to interference signals, in accordance with an aspect of the present disclosure. Aspects of the DRX mode may be implemented by the UEs 115 and/or by the base stations 105 discussed above with respect to the previous Figures. Generally, FIG. 7 illustrates the situation where the UE wakes up to attempt a first measurement period 705, determines that there is an increased interference level, and abandons the measurement period 705. Generally, the UE may identify a first measurement period 705 according to any of the techniques described herein. Accordingly, the UE may wake up at the appropriate time to perform the warm-up measurement during the measurement period 705.

The UE may initially determine that there is an increased level of interference based on, for example, the $BS_{1\text{-}ABS}$ transmitting information and/or control information during period 715 and the relatively higher power level transmission period 725 of $BS_{2\text{-}Interference}$. In that instance, the UE may determine that the measurement period 705 is not optimal to achieve the desired results and stop taking measurements. Further, the UE may determine that a second measurement period 710 may produce better results and wake up again to attempt the warm-up measurements during the measurement period 710. The UE may identify the second measurement period 710 based on the eICIC data available to the UE. As shown in FIG. 7, the measurement period 710 substantially aligns in the time domain with an ABS subframe 720 of $BS_{1\text{-}ABS}$ and the lower power level transmission period 730 of $BS_{2\text{-}Interference}$, i.e., transmission period 730 has a lower power level with respect to transmission periods 725 and/or 735. By identifying the second measurement period 710, the UE may wake up to perform the warm-up measurements during reduced interference from $BS_{1\text{-}ABS}$ and $BS_{2\text{-}Interference}$.

Figure 8:
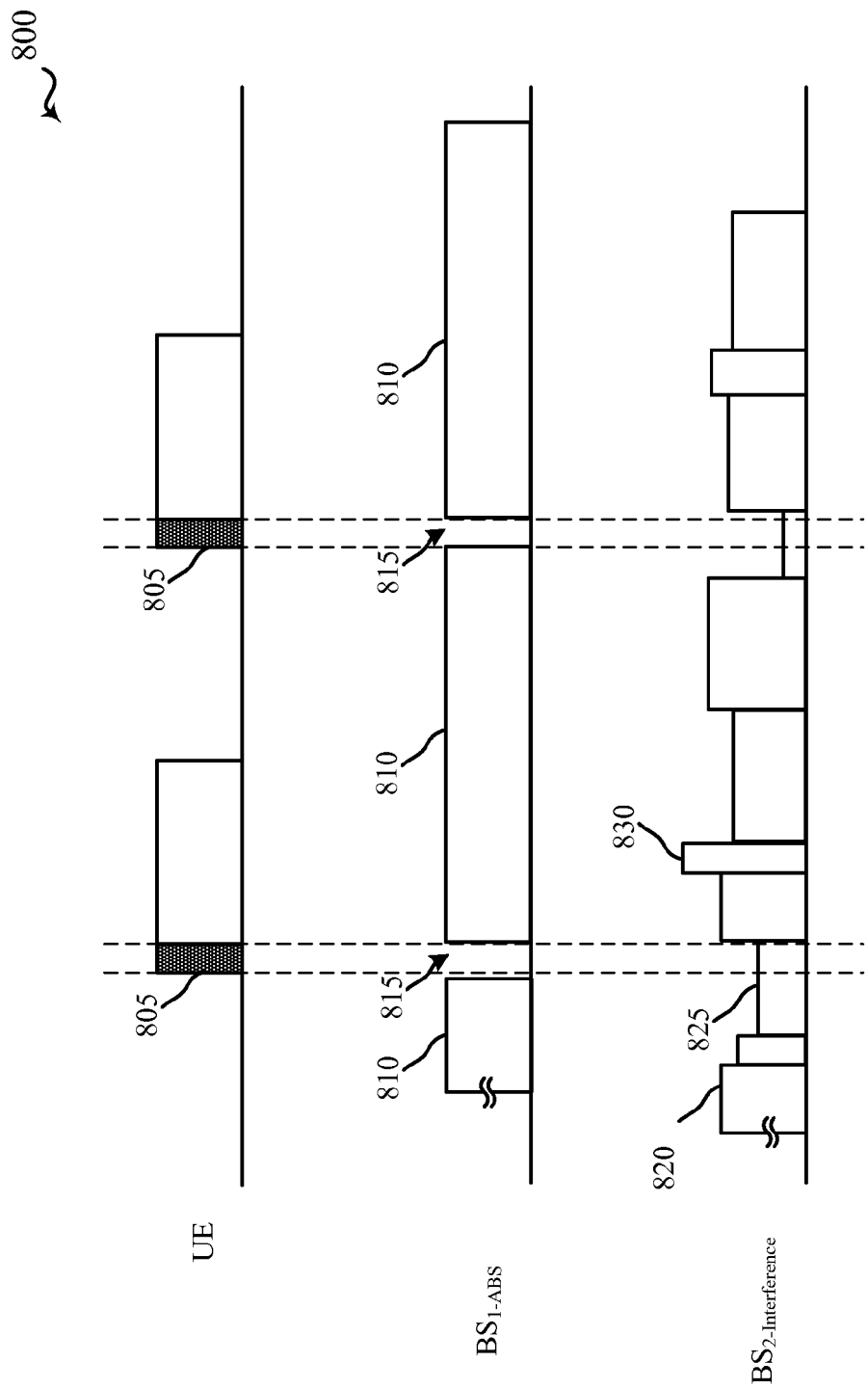
FIG. 8 shows a block diagram conceptually illustrating a DRX mode in relation to interference signals, in accordance with an aspect of the present disclosure.

FIG. 8 shows a block diagram 800 conceptually illustrating a DRX mode in relation to interference signals, in accordance with an aspect of the present disclosure. Aspects of the DRX mode may be implemented by the UEs 115 and/or by the base stations 105 discussed above with respect to the previous Figures. Generally, FIG. 8 illustrates the situation where the serving base station and/or the network configures or otherwise provides reduced interference during a scheduled measurement period of the UE. The UE may be in a DRX mode and perform warm-up measurements during the measurement period 805. As shown in FIG. 8, the measurement period 805 are immediately prior to the UE transitioning to the DRX on state. A network and/or the serving base station, e.g., $BS_{1\text{-}ABS}$, $BS_{2\text{-}Interference}$, or a different base station may be aware of the measurement period 805 of the UE. The network and/or the serving base station may adapt some aspects of the eICIC configuration for the wireless communications network based on this knowledge.

In the example shown in FIG. 8, the $BS_{1\text{-}ABS}$ may be configured to transmit data and/or control information during transmission periods 810 and transmit an ABS subframe during the transmission periods 815 that are substantially aligned with the measurement period 805 of the UE. Similarly, the $BS_{2\text{-}Interference}$ may be configured to transmit at a higher power level during transmission periods 820 and 830 but transmit at a lower power level during transmission period 825 that is also substantially aligned with the measurement period 805. As such, the measurement period 805 is located within an ABS subframe that immediately precedes a subframe associated with transitioning to the DRX on state. As can be seen, aspects of the present disclosure may provide the network-assisted reduced interference levels during the measurement period of the UE.

Figure 9:
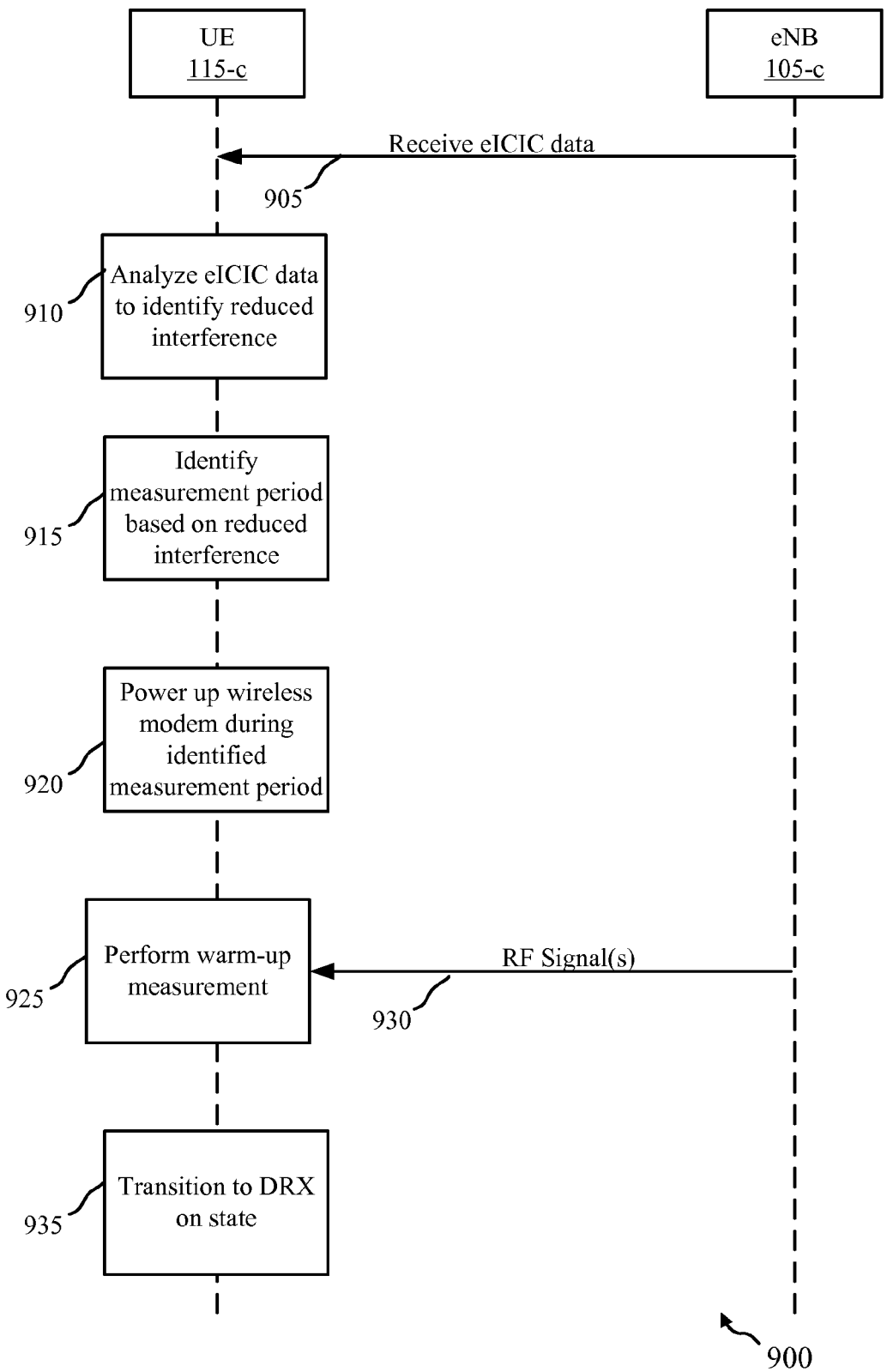
FIG. 9 shows a block diagram conceptually illustrating an example of communications between an eNB and a UE, in accordance with an aspect of the present disclosure.

FIG. 9 is a block diagram conceptually illustrating an example of communications between an eNB 105-c and a UE 115-c, in accordance with an aspect of the present disclosure. The UE 115-c may be an example of one or more of the UEs 115 described in the previous Figures and the eNB 105-c may be an example of one or more of the base stations 105 described in the previous figures. Generally, FIG. 9 illustrates a process 900 for determining a DRX wakeup rule similar to the process 400 of FIG. 4, but with the UE 115-c receiving at least a portion of the eICIC data from the eNB 105-c.

At block 905 the UE 115-c may receive at least a portion of the eICIC data available to the UE 115-c from the eNB 105-c. The eNB 105-c may be a serving base station of the UE 115-c. The eNB 105-c may be a component of a heterogeneous wireless communications network and operating in an eICIC environment. The eNB 105-c may determine at least a portion of the eICIC data and/or receive the eICIC data from the network. The eICIC data may include information indicative of subframes/time-intervals that interference level is low, e.g., measurement subframe pattern for serving cell, subframe set0 for CSI report. In some aspects, the eICIC data may also include information indicative of ABS/non-ABS patterns and classification based on the periodicity of the ABS patterns known from network parameters and a trace of noise. In some aspects, the eICIC data received from the eNB 105-c may include at least one measurement subframe pattern associated with channel state information measurements of the eNB 105-c.

At block 910 the UE 115-c may analyze eICIC data to identify reduced interference. For example, the UE 115-c may analyze the eICIC data to determine a period prior to the beginning of a DRX on state that has reduced interference with respect to other periods. The reduced interference period may correlate to periods of reduced transmissions by the eNB 105-c, e.g., periods where the eNB 105-c has no data to transfer and/or when the eNB 105-c will be transmitting an ABS subframe. At block 915, the UE 115-c may identify a measurement period based on the reduced interference. At block 920, the UE 115-c may power up the wireless modem during the identified measurement period. At block 925, the UE 115-c performs the warm-up measurement and measures one or more RF signals at block 930 from the eNB 105-c. Based on the measured RF signals, the UE 115-c may determine the channel parameters or conditions of the eNB 105-c. At block 935, the UE 115-c may transition to a DRX on state in accordance with the DRX mode.

Figure 10:
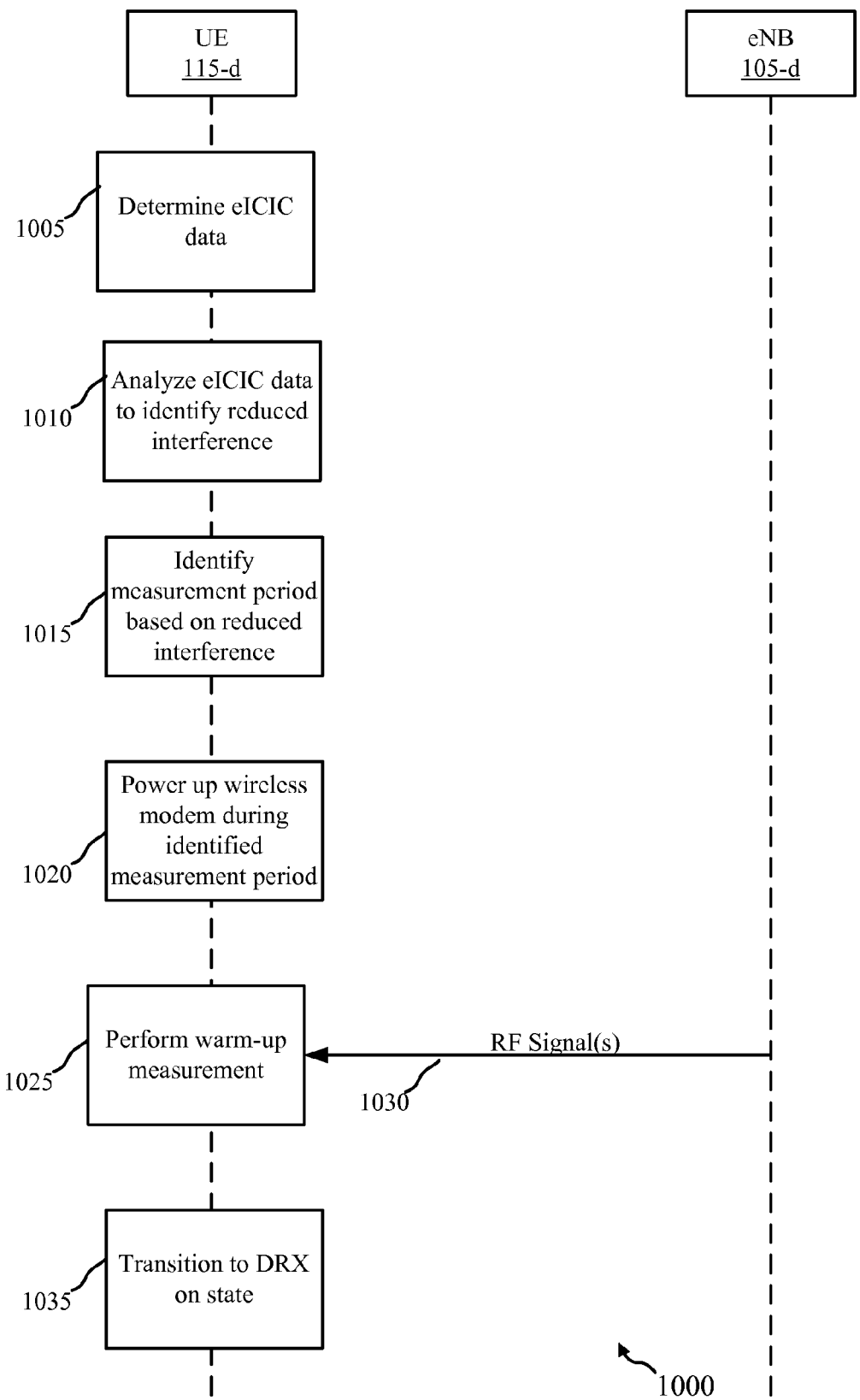
FIG. 10 shows a block diagram conceptually illustrating an example of communications between an eNB and a UE, in accordance with an aspect of the present disclosure.

FIG. 10 is a block diagram conceptually illustrating an example of communications between an eNB 105-d and a UE 115-d, in accordance with an aspect of the present disclosure. The UE 115-d may be an example of one or more of the UEs 115 described in the previous Figures and the eNB 105-d may be an example of one or more of the base stations 105 described in the previous figures. Generally, FIG. 10 illustrates a process 1000 for determining a DRX wakeup rule similar to the process 400 of FIG. 4, but with the UE 115-d determining at least a portion of the eICIC data.

At block 1005 the UE 115-d may determine at least a portion of the eICIC data. For example, the UE 115-d may determine at least one measurement subframe pattern associated with channel state information measurements of the eNB 105-d. The UE 115-d may measure at least one interference pattern from neighbor eNBs over a period of time such that the ABS pattern is based on the measured interference pattern. The UE 115-d may be configured to determine, during reception of a subframe, that the subframe comprises an ABS subframe. In some aspects, the UE 115-d may be configured to determine an ABS/non-ABS classification based on the periodicity of the ABS patterns. As such, the UE 115-d may determine at least a portion of the eICIC data associated with a heterogeneous wireless communications network and use the eICIC data to determine the DRX wakeup rule.

At block 1010 the UE 115-d may analyze the eICIC data to identify reduced interference. For example, the UE 115-d may analyze the eICIC data to determine a period prior to the beginning of a DRX on state that has reduced interference with respect to other periods. The reduced interference period may correlate to periods of reduced transmissions by the eNB 105-d. At block 1015, the UE 115-d may identify a measurement period based on the reduced interference. In some aspects, the UE 115-d may refrain from performing the warm-up measurement in response to a substantial alignment between the DRX on state and at least one ABS subframe of the determined ABS pattern. For example, the UE 115-d may determine an ABS pattern associated with reduced interference during which one or more of the neighbor base stations are transmitting ABS subframes. The UE 115-d may determine that when at least one ABS subframe is substantially aligned with the DRX on state, i.e., they occur at or near substantially the same time, a warm-up measurement may be unnecessary and, therefore, refrain from waking up to perform the warm-up measurement.

At block 1020, the UE 115-d may power up the wireless modem during the identified measurement period. At block 1025, the UE 115-d performs the warm-up measurement and measures one or more RF signals at block 1030 from the eNB 105-d. Based on the measured RF signals, the UE 115-d may determine the channel parameters or conditions of the eNB 105-d. At block 1035, the UE 115-d may transition to a DRX on state in accordance with the DRX mode.

Figure 11:
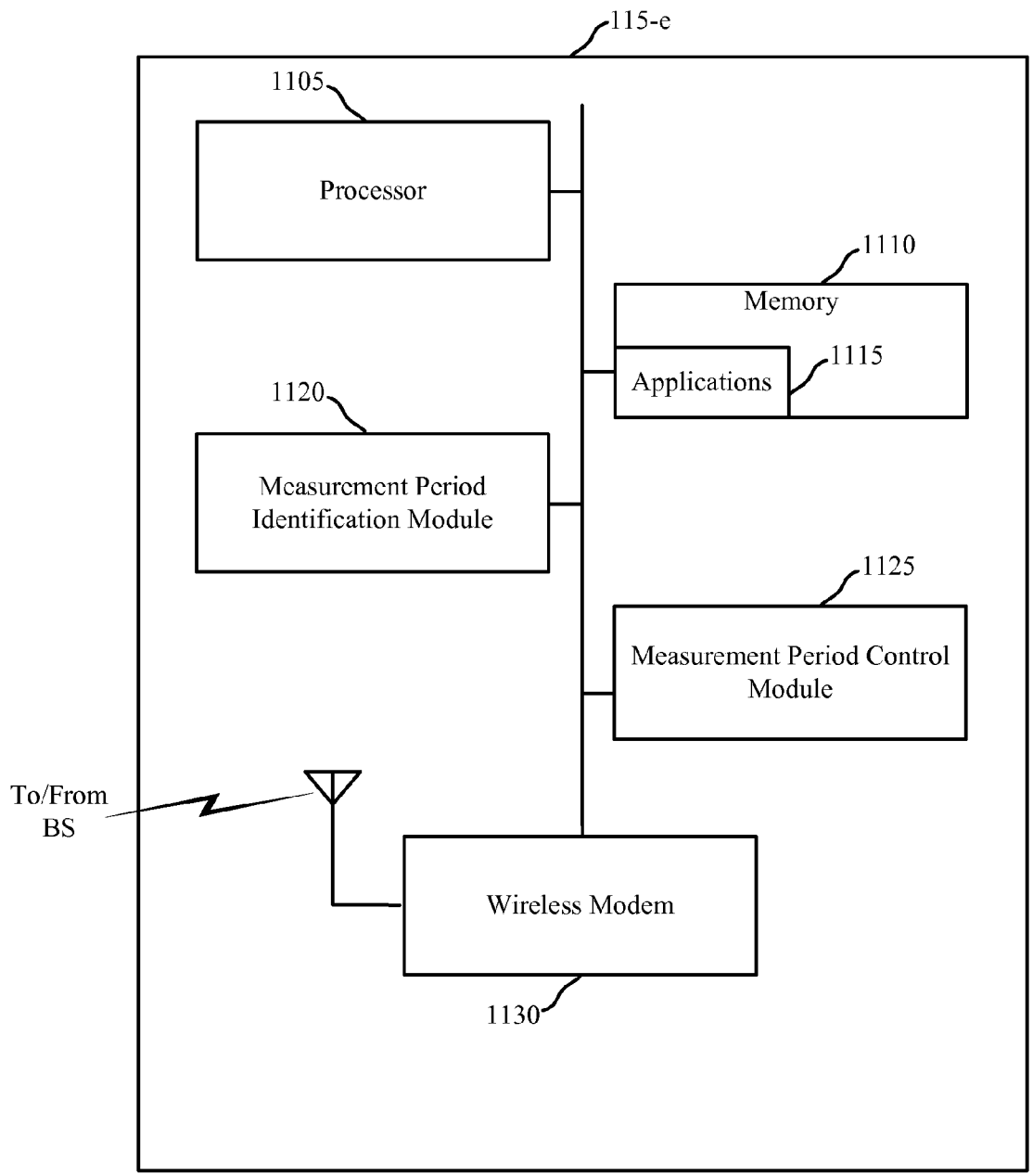
FIG. 11 shows a block diagram of an exemplary UE in accordance with an aspect of the present disclosure.

FIG. 11 is a block diagram 1100 conceptually illustrating an example of a UE 115-e in accordance with aspects of the present disclosure. The UE 115-e may be an example of one or more of the UEs 115 discussed above with reference to the previous Figures. The UE 115-e may include a processor 1105, a memory 1110, a measurement period identification module 1120, a measurement period control module 1125, and a wireless modem 1130. Each of these components may be in communication, directly or indirectly.

The processor 1105 may be configured to execute computer-readable program code stored by the memory 1110 to implement one or more aspects of the measurement period identification module 1120, the measurement period control module 1125, and/or the wireless modem 1130. The processor 1105 may also execute computer-readable program code stored by the memory 1110 to execute applications 1115.

The wireless modem 1130 may be configured to modulate packets and provide the modulated packets to the antenna for transmission, and to demodulate packets received from the antenna. The wireless modem 1130 may be implemented as one or more transmitter modules and one or more separate receiver modules. The wireless modem 1130 may be configured to communicate bi-directionally, via the antenna, with one or more base stations (e.g., one or more of the base stations 105 of the previous Figures) of a radio access network (e.g., wireless communications system 100 of FIG. 1). In some cases, the operation of one or more aspects of the wireless modem 1130 may be coordinated by the processor 1105.

The measurement period identification module 1120 may be configured to identify a measurement period associated with reduced interference from one or more cells in a wireless communications network. The measurement period identification module 1120 may identify the measurement period based at least in part on eICIC data available to the UE 115-c. The measurement period identification module 1120 may be configured to determine at least a portion of the eICIC data based on one or more measurements of channel parameters over a period of time. Additionally or alternatively, the measurement period identification module 1120 may be configured to receive the eICIC data from a serving base station, for example.

The measurement period control module 1125 may be configured to power up the wireless modem 1130 to perform a warm-up measurement of the serving cell during the identified measurement period prior to transitioning the UE 115-e to the DRX on state.

Figure 12:
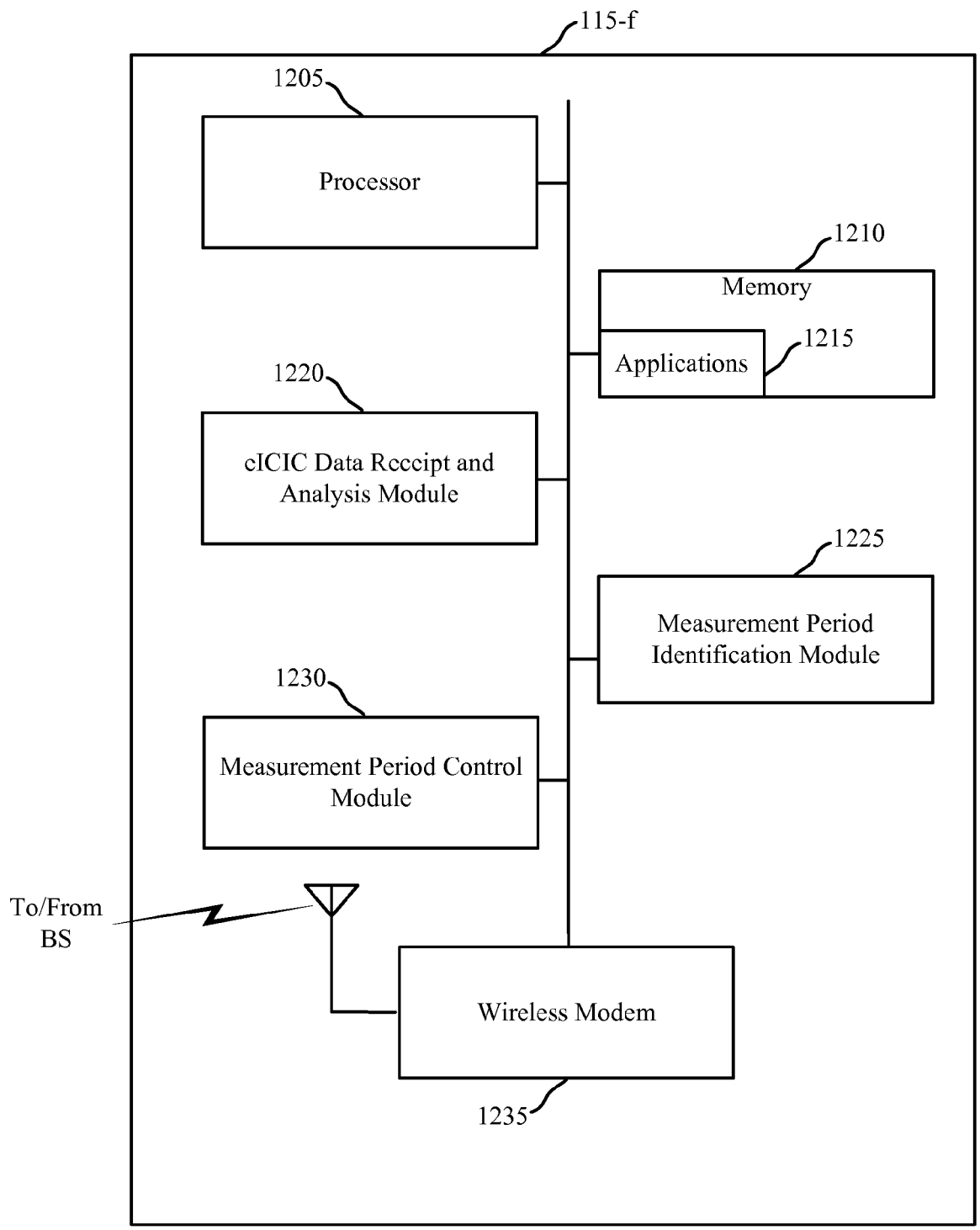
FIG. 12 shows a block diagram of another exemplary UE in accordance with an aspect of the present disclosure.

FIG. 12 is a block diagram 1200 conceptually illustrating an example of a UE 115-f in accordance with aspects of the present disclosure. The UE 115-f may be an example of one or more of the UEs 115 discussed above with reference to the previous Figures. The UE 115-f may include a processor 1205, a memory 1210, an eICIC data receipt and analysis module 1220, a measurement period identification module 1225, a measurement period control module 1230, and a wireless modem 1235. Each of these components may be in communication, directly or indirectly.

The processor 1205 may be configured to execute computer-readable program code stored by the memory 1210 to implement one or more aspects of the eICIC data receipt and analysis module 1220, the measurement period identification module 1225, the measurement period control module 1230, and/or the wireless modem 1235. The processor 1205 may also execute computer-readable program code stored by the memory 1210 to execute applications 1215.

The wireless modem 1235 may be configured to modulate packets and provide the modulated packets to the antenna for transmission, and to demodulate packets received from the antenna. The wireless modem 1235 may be implemented as one or more transmitter modules and one or more separate receiver modules. The wireless modem 1235 may be configured to communicate bi-directionally, via the antenna, with one or more base stations (e.g., one or more of the base stations 105 of the previous Figures) of a radio access network (e.g., wireless communications system 100 of FIG. 1). In some cases, the operation of one or more aspects of the wireless modem 1235 may be coordinated by the processor 1205.

The eICIC data receipt and analysis module 1220 may be configured to receive and analyze at least a portion of the eICIC data transmitted from a serving base station. For example, the serving base station may transmit eICIC data that includes information indicative of subframes/time-interval that interference level is low, one or more ABS/Non-ABS patterns, and the like. The eICIC data receipt and analysis module 1220 may be configured to receive and analyze such eICIC data and provide information indicative of at least a portion of the eICIC data to the measurement period identification module 1225.

The measurement period identification module 1225 may be configured to identify a measurement period associated with reduced interference from one or more cells in a wireless communications network. The measurement period identification module 1225 may identify the measurement period based at least in part on eICIC data received from the eICIC data receipt and analysis module 1220. The measurement period control module 1230 may be configured to power up the wireless modem 1235 to perform a warm-up measurement of the serving cell during the identified measurement period prior to transitioning the UE 115-f to the DRX on state.

Figure 13:
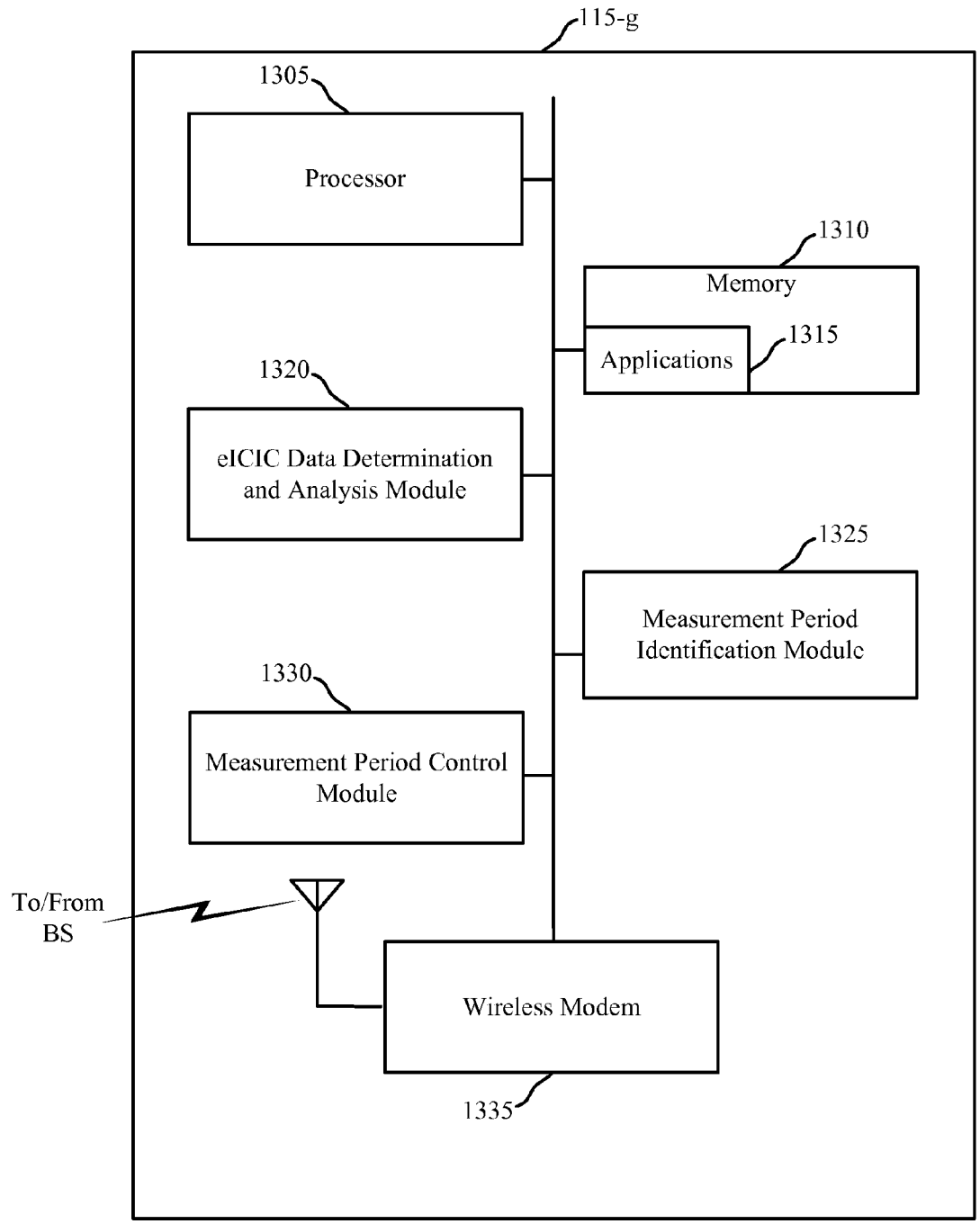
FIG. 13 shows a block diagram of an exemplary UE in accordance with an aspect of the present disclosure.

FIG. 13 is a block diagram 1300 conceptually illustrating an example of a UE 115-g in accordance with aspects of the present disclosure. The UE 115-g may be an example of one or more of the UEs 115 discussed above with reference to the previous Figures. The UE 115-g may include a processor 1305, a memory 1310, an eICIC data determination and analysis module 1320, a measurement period identification module 1325, a measurement period control module 1330, and a wireless modem 1335. Each of these components may be in communication, directly or indirectly.

The processor 1305 may be configured to execute computer-readable program code stored by the memory 1310 to implement one or more aspects of the eICIC data determination and analysis module 1320, the measurement period identification module 1325, the measurement period control module 1330, and/or the wireless modem 1335. The processor 1305 may also execute computer-readable program code stored by the memory 1310 to execute applications 1315.

The wireless modem 1335 may be configured to modulate packets and provide the modulated packets to the antenna for transmission, and to demodulate packets received from the antenna. The wireless modem 1335 may be implemented as one or more transmitter modules and one or more receiver modules. The wireless modem 1335 may be configured to communicate bi-directionally, via the antenna, with one or more of the base stations described above with reference to the previous Figures. In some cases, the operation of one or more aspects of the wireless modem 1335 may be coordinated by the processor 1305.

The eICIC data determination and analysis module 1320 may be configured to determine at least a portion of the eICIC data. In some configurations, the eICIC data determination and analysis module 1320 may one or more sub-modules configured to determine one or more aspects of the eICIC data. For example, the eICIC data determination and analysis module 1320 may be configured to determine an ABS pattern associated with one or more cells in the wireless communications network. The eICIC data determination and analysis module 1320 may also be configured to measure one or more interference patterns associated with one or more cells over a period of time. The eICIC data determination and analysis module 1320 may provide information indicative of the eICIC data to the measurement period identification module 1325.

The measurement period identification module 1325 may be configured to identify a measurement period associated with reduced interference from one or more cells in a wireless communications network. The measurement period identification module 1325 may identify the measurement period based at least in part on eICIC data received from the eICIC data determination and analysis module 1320. In some aspects, the measurement period identification module 1325 may be configured to refrain from performing the warm-up measurement in response to the eICIC determination and analysis module 1320 determining a substantial alignment between the DRX on state and at least one ABS subframe. The measurement period control module 1330 may be configured to power up the wireless modem 1335 to perform a warm-up measurement of the serving cell during the identified measurement period prior to transitioning the UE 115-g to the DRX on state.

Figure 14:
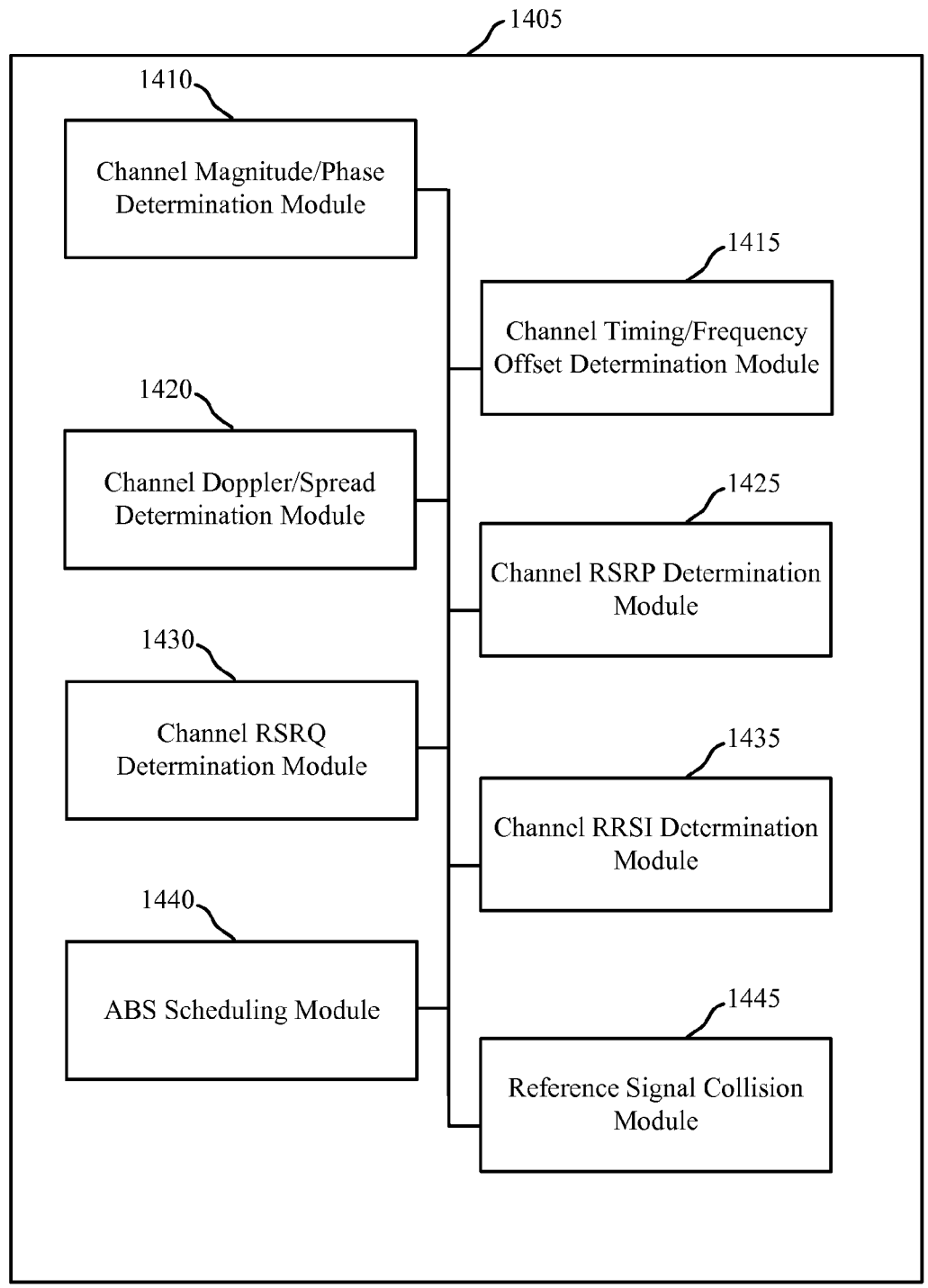
FIG. 14 shows a block diagram of an exemplary measurement period identification module, in accordance with an aspect of the present disclosure.

FIG. 14 shows a block diagram 1400 of an exemplary measurement period identification module 1405, in accordance with an aspect of the present disclosure. The measurement period identification module 1405 may be an example of one or more of the measurement period identification modules discussed above with reference to the previous Figures. The measurement period identification module 1405 may include a channel magnitude/phase determination module 1410, a channel timing/frequency offset determination module 1415, a channel Doppler/spread determination module 1420, a channel received signal received power (RSRP) determination module 1425, a channel reference signal received quality (RSRQ) determination module 1430, a channel received signal strength indicator (RRSI) determination module 1435, an ABS scheduling module 1440, and a reference signal collision module 1445. Each of these components may be in communication, directly or indirectly. Each of these components may be configured to permit a UE to determine at least a portion of the eICIC data. As discussed above, the components may receive at least a portion of the eICIC data from a serving base station or at least a portion of the eICIC data may be determined by the UE incorporating the measurement period identification module 1405.

The channel magnitude/phase determination module 1410 may be configured to receive and analyze information indicative of one or more channels of the wireless communications network to determine a magnitude and/or phase of signals associated with at least one of the channels. The information relating to the magnitude and/or phase the signals may be utilized by the measurement period identification module 1405 to determine periods of reduced interference. The channel timing/frequency offset determination module 1415 may be configured to receive and analyze information indicative of one or more channels to determine a timing and/or frequency offset for at least one of the channels. The timing and/or frequency offset information for the channel may additionally or alternatively be utilized to determine a period of reduced interference. The channel Doppler/spread determination module 1420 may be configured to receive and analyze one or more channels to identify Doppler parameters and/or the spread determination for at least one of the channels. The Doppler parameters and/or the spread determination information may be utilized to determine periods of reduced interference.

The RSRP determination module 1425 may receive an analyze information associated with one or more channels indicative of a measurement of the received power of the reference signal associated with at least one of the channels. The received power of the reference signal may additionally or alternatively be utilized to determine a period of reduced interference. The channel RSRQ determination module 1430 may be configured to receive and analyze information associated with one or more channels indicative of the receive quality of the reference signal associated with at least one of the channels. The channel RRSI determination module 1435 may be configured to receive and analyze information associated with one or more channels indicative of a received signal strength associated with at least one of the channels. The signal strength indicator may additionally or alternatively be utilized to determine periods of reduced interference.

The ABS scheduling module 1440 may be configured to determine an ABS pattern for one or more neighboring cells. In certain examples, the ABS scheduling module 1440 may observe transmissions by the neighboring cells to identify the ABS pattern for a neighboring cell and predict a next ABS for that neighboring cell based on the pattern. Additionally or alternatively, the ABS scheduling module 1440 may receive network signaling that includes ABS scheduling information for one or more of the neighboring cells. The known ABS patterns may then be leveraged by the UE to identify a wake-up period to perform warm-up measurements that coincides with one or more ABS patterns, thereby enabling the UE to obtain a higher quality channel estimation during the warm-up measurements. In certain examples, the ABS scheduling module 1440 may identify periods in which multiple ABS from different neighboring cells overlap to allow for warm-up measurements to be performed with the lowest possible interference.

The reference signal collision module 1445 may be configured to determine whether the reference signals of a neighboring or interfering cell collide with the reference signals of the serving cell for the UE. In the event that such a collision is detected, the UE may determine that any subframe for that particular neighboring or interfering cell is suitable for warm-up measurements, as discussed above, and instead construct the wake-up schedule around interference patterns from other neighboring cells and/or power conservation considerations. It is to be understood that aspects of the present disclosure contemplate that information from one, a mixture, or all of the components of the measurement period identification module 1405 may be utilized to determine periods of reduced interference to identify an associated measurement period.

Figure 15:
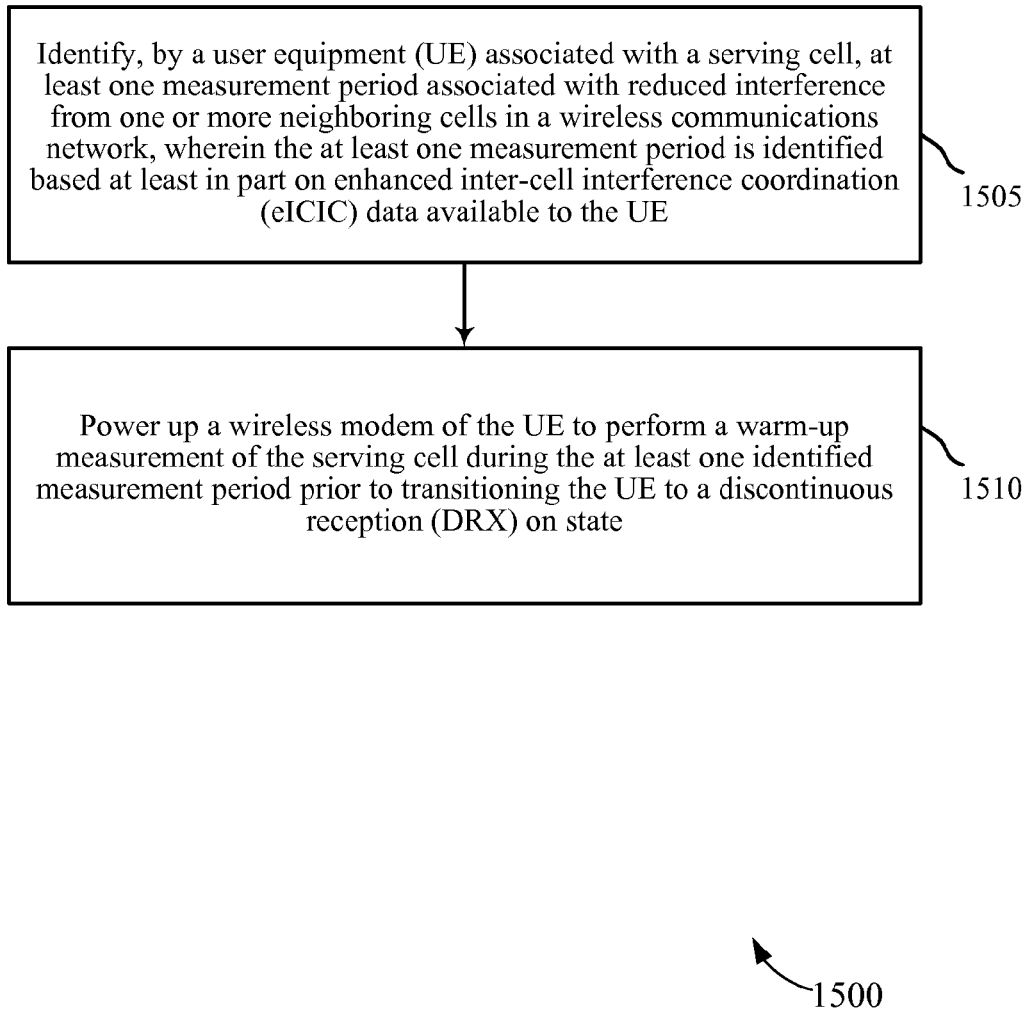
FIG. 15 shows a flowchart of a method for wireless communications in accordance with an aspect of the present disclosure.

FIG. 15 is a flowchart conceptually illustrating an example of a method 1500 for wireless communication in accordance with an aspect of the present disclosure. Specifically, the FIG. 15 illustrates a method 1500 for a UE to determine a DRX wakeup rule in an eICIC environment. The method 1500 may be implemented in one or more of the wireless communications systems 100 and/or 200 described above with regards to the previous Figures. Additionally, the method 1500 may be performed by one or more of the UEs 115 described above with regards to the previous Figures.

At block 1505, the UE may identify at least one measurement period associated with reduced interference from one or more neighboring cells in a wireless communications system. The measurement period may be determined based on eICIC data that is available to the UE. For example, the UE may assess eICIC data to determine when interference is likely to occur based on the resources and channels used by neighboring cells in addition to information about the position and trajectory of the UE with respect to one or more of the neighboring cells, the measured interference from the neighboring cells, and other data. One or more of the measurement period identification modules 1120, 1225, 1325, 1405 of FIGS. 11-14 may be means for performing the functionality of block 1505. Additional means for performing the functionality of block 1505 include, but are not limited to, the eICIC data receipt and analysis module 1220 of FIG. 12, the eICIC data determination and analysis module 1320 of FIG. 13, and/or one or more of the processors 1105, 1205, 1305 or memory 1110, 1210, or 1310 of FIGS. 11-13.

At block 1510, the UE may power up a wireless modem to perform a warm-up measurement of the serving cell during the identified measurement period. The UE may perform the warm-up measurement prior to the UE transitioning to a DRX on state. One or more of the measurement period control modules 1125, 1230, and 1330, of FIGS. 11-13 may be means for performing the functionality of block 1510. Additional means for performing the functionality of block 1510 may include, but are not limited to, one or more of the processors 1105, 1205, 1305 or memory 1110, 1210, or 1310 of FIGS. 11-13.

Figure 16:
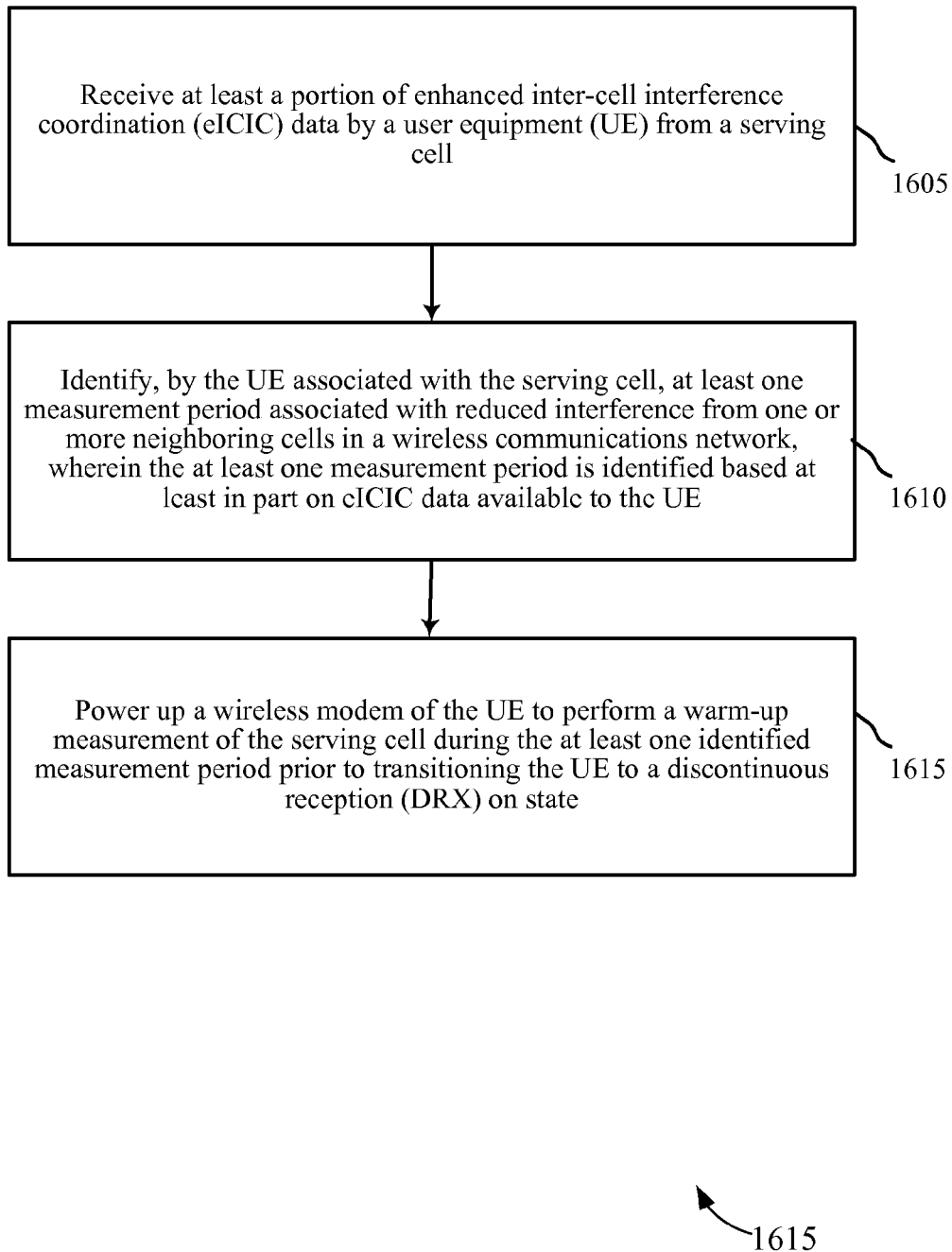
FIG. 16 shows a flowchart of another method for wireless communications in accordance with an aspect of the present disclosure.

FIG. 16 is a flowchart conceptually illustrating an example of a method 1600 for wireless communication in accordance with an aspect of the present disclosure. Specifically, FIG. 16 illustrates a method 1600 for a UE to determine a DRX wake up rule in an eICIC environment where the UE receives the eICIC data. The method 1600 may be implemented in one or more of the wireless communications systems 100 and/or 200 described above with regards to the previous Figures. Additionally, the method 1600 may be performed by one or more of the UEs 115 described above with regard to the previous Figures.

At block 1605, a UE receives at least a portion of the eICIC data from a serving cell. The eICIC data may include information indicative of an eICIC scheme employed in a heterogeneous wireless communications network. One or more of the wireless modems 1130, 1235, 1335 or associated antennas of FIGS. 11-13, one or more of the processors 1105, 1205, 1305 of FIGS. 11-13, and/or one or more of the memories 1110, 1210, 1310 of FIGS. 11-13 may be means for performing the functionality of block 1605.

At block 1610, the UE may identify at least one measurement period associated with reduced interference from one or more neighboring cells in a wireless communications system. The measurement period may be determined based on eICIC data received from the serving cell. The measurement period may be determined based on eICIC data that is available to the UE. For example, the UE may assess eICIC data to determine when interference is likely to occur based on the resources and channels used by neighboring cells in addition to information about the position and trajectory of the UE with respect to one or more of the neighboring cells, the measured interference from the neighboring cells, and other data. One or more of the measurement period identification modules 1120, 1225, 1325, 1405 of FIGS. 11-14 may be means for performing the functionality of block 1605. Additional means for performing the functionality of block 1605 include, but are not limited to the eICIC data receipt and analysis module 1220 of FIG. 12, the eICIC data determination and analysis module 1320 of FIG. 13, and/or one or more of the processors 1105, 1205, 1305 or memory 1110, 1210, or 1310 of FIGS. 11-13.

At block 1615, the UE may power up a wireless modem to perform a warm-up measurement of the serving cell during the identified measurement period. The UE may perform the warm-up measurement prior to the UE transitioning to a DRX on state. One or more of the measurement period control modules 1125, 1230, and 1330, of FIGS. 11-13 may be means for performing the functionality of block 1615. Additional means for performing the functionality of block 1615 may include, but are not limited to, one or more of the processors 1105, 1205, 1305 or memory 1110, 1210, or 1310 of FIGS. 11-13.

Figure 17:
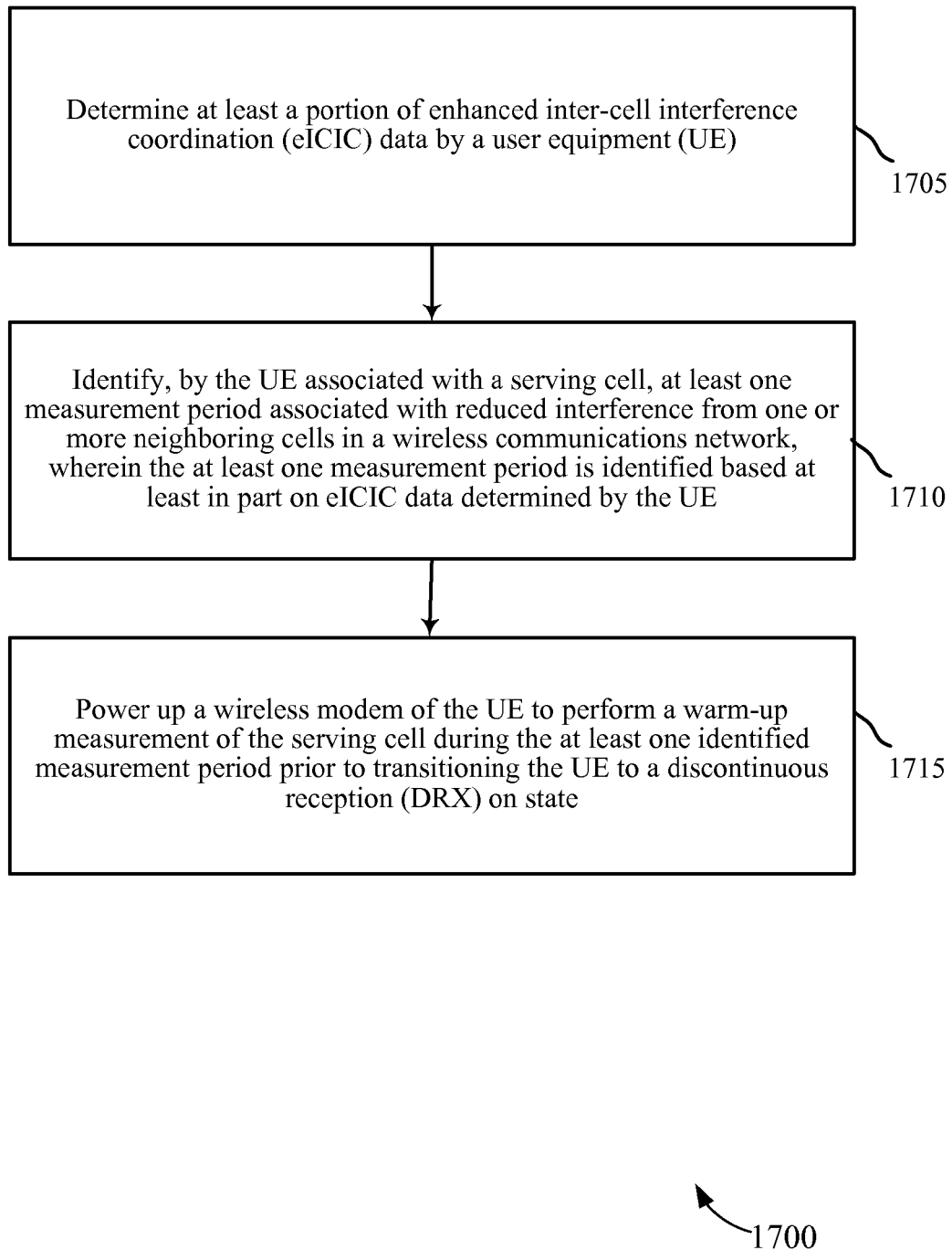
FIG. 17 shows a flowchart of another method for wireless communications in accordance with an aspect of the present disclosure.

FIG. 17 is a flowchart conceptually illustrating an example of a method 1700 for wireless communication in accordance with an aspect of the present disclosure. Specifically, FIG. 17 illustrates a method 1700 for a UE to determine a DRX wakeup rule in an eICIC environment where the UE determines the eICIC data. The method 1700 may be implemented in one or more of the wireless communications systems 100 and/or 200 described above with regards to the previous Figures. Additionally, the method 1700 may be performed by one or more of the UEs 115 described above with regards to the previous Figures.

At block 1705, a UE determines at least a portion of the eICIC data. The eICIC data may include information indicative of an eICIC scheme employed in a heterogeneous wireless communications network, e.g., an interference pattern and/or and ABS pattern associated with the network. The data determination and analysis module 1320, processor 1305, and/or memory 1310 of FIG. 13 may be one example of means for performing the functionality of block 1705.

At block 1710, the UE may identify at least one measurement period associated with reduced interference from one or more neighboring cells in a wireless communications system. The measurement period may be determined based on eICIC data determined by the UE. For example, the UE determine when interference is likely to occur based on the resources and channels used by neighboring cells in addition to information about the position and trajectory of the UE with respect to one or more of the neighboring cells, the measured interference from the neighboring cells, and other data. One or more of the measurement period identification modules 1120, 1225, 1325, 1405 of FIGS. 11-14 may be means for performing the functionality of block 1605. Additional means for performing the functionality of block 1710 include, but are not limited to the eICIC data receipt and analysis module 1220 of FIG. 12, the eICIC data determination and analysis module 1320 of FIG. 13, and/or one or more of the processors 1105, 1205, 1305 or memory 1110, 1210, or 1310 of FIGS. 11-13.

At block 1715, the UE may power up a wireless modem to perform a warm-up measurement of the serving cell during the identified measurement period. The UE may perform the warm-up measurement prior to the UE transitioning to a DRX on state. One or more of the measurement period control modules 1125, 1230, and 1330, of FIGS. 11-13 may be means for performing the functionality of block 1715. Additional means for performing the functionality of block 1715 may include, but are not limited to, one or more of the processors 1105, 1205, 1305 or memory 1110, 1210, or 1310 of FIGS. 11-13.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of" indicates a disjunctive list such that, for example, a list of "at least one of A, B, or C" means A or B or C or AB or AC or BC or ABC (i.e., A and B and C).

As used herein, including in the claims, the terms "a" or "an" means one or more than one, unless explicitly stated otherwise.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication comprising:
identifying, by a user equipment (UE) associated with a serving cell, measurement period opportunities during a discontinuous reception (DRX) off period, wherein the DRX off period precedes a DRX on period, and wherein the measurement period opportunities are associated with reduced interference from one or more neighboring cells in a wireless communications network;
prioritizing the measurement period opportunities based at least in part on enhanced inter-cell interference coordination (eICIC) data available to the UE and a location of the measurement period relative to a start of the DRX on period; and
powering up a wireless modem of the UE to perform a warm-up measurement of the serving cell during a measurement period of the prioritized measurement period opportunities.

2. The method of claim 1, further comprising:
receiving at least a portion of the eICIC data by the UE from the serving cell.

3. The method of claim 2, wherein receiving at least the portion of the eICIC data from the serving cell comprises:
receiving a measurement subframe pattern associated with channel state information measurements of the serving cell.

4. The method of claim 1, further comprising:
determining at least a portion of the eICIC data by the UE.

5. The method of claim 4, wherein determining at least the portion of the eICIC data by the UE further comprises:
determining an almost-blank signal (ABS) pattern associated with the one or more neighboring cells in the wireless communications network.

6. The method of claim 5, further comprising:
measuring an interference pattern from the one or more neighboring cells over a period of time;
wherein the ABS pattern is based on the measured interference pattern.

7. The method of claim 4, wherein determining at least the portion of the eICIC data by the UE further comprises:
determining, during reception of a subframe, that the subframe comprises an ABS subframe.

8. The method of claim 1, wherein the measurement period of the measurement periods is identified based at least in part on one or more of a DRX offset associated with the UE, a DRX periodicity associated with the UE, a DRX on duration associated with the UE, a Doppler estimate measured by the UE, or an SNR estimate measured by the UE.

9. The method of claim 1, further comprising:
identifying a dominant interfering cell of the UE; and
wherein identifying the measurement period of the measurement periods is identified based on a parameter of the dominant interfering cell.

10. The method of claim 9, wherein the parameter of the dominant interfering cell comprises one or more of a reference signal location or a signal strength.

11. The method of claim 1, further comprising:
identifying a reference signal collision among a plurality of the one or more neighboring cells in the wireless communications network;
wherein the measurement period of the measurement periods is identified based at least in part on the reference signal collision.

12. The method of claim 11, wherein the measurement period is located within an almost-blank signal (ABS) subframe that immediately precedes a subframe associated with transitioning to the DRX on state.

13. The method of claim 1, further comprising:
comparing one or more parameters measured by the UE for different cells;
wherein the measurement period of the measurement periods is identified based on the comparison of the one or more parameters.

14. The method of claim 13, wherein the one or more parameters comprise one or more of a Doppler evolution, a timing error, or a frequency error associated with each of the one or more neighboring cells.

15. An apparatus for wireless communications comprising:
a processor;
memory in electronic communication with the processor; and
instructions being executed by the processor to:
identify, by a user equipment (UE) associated with a serving cell, measurement period opportunities during a discontinuous reception (DRX off period, wherein the DRX off period precedes a DRX on period, and wherein the measurement period opportunities are associated with reduced interference from one or more neighboring cells in a wireless communications network;
prioritize the measurement period opportunities based at least in part on enhanced inter-cell interference coordination (eICIC) data available to the UE and a location of the measurement period relative to a start of the DRX on period; and
power up a wireless modem of the UE to perform a warm-up measurement of the serving cell during a measurement period of the prioritized measurement period opportunities.

16. The apparatus of claim 15, further comprising:
instructions to receive at least a portion of the eICIC data by the UE from the serving cell; and
instructions to receive a measurement subframe pattern associated with channel state information measurements of the serving cell.

17. The apparatus of claim 15, further comprising instructions to:
determine at least a portion of the eICIC data by the UE.

18. The apparatus of claim 17, wherein the instructions to determine at least the portion of the eICIC data by the UE further comprises instructions to:
determine an almost-blank signal (ABS) pattern associated with the one or more neighboring cells in the wireless communications network.

19. The apparatus of claim 18, further comprising instructions to:
measure an interference pattern from the one or more neighboring cells over a period of time;
wherein the ABS pattern is based on the measured interference pattern.

20. The apparatus of claim 17, wherein the instructions to determine at least the portion of the eICIC data by the UE further comprises instructions to:
determine, during reception of a subframe, that the subframe comprises an ABS subframe.

21. An apparatus for wireless communication comprising:
means for identifying, by a user equipment (UE) associated with a serving cell, measurement period opportunities during a discontinuous reception 9DRX) off period, wherein the DRX off period precedes a DRX on period, and wherein the measurement period opportunities are associated with reduced interference from one or more neighboring cells in a wireless communications network;
means for prioritizing the measurement period opportunities are identified based at least in part on enhanced inter-cell interference coordination (eICIC) data available to the UE and a location of the measurement period relative to a start of the DRX on period; and
means for powering up a wireless modem of the UE to perform a warm-up measurement of the serving cell a measurement period of the prioritized measurement period opportunities.

22. The apparatus of claim 21, further comprising:
means for receiving at least a portion of the eICIC data by the UE from the serving cell; and
means for receiving a measurement subframe pattern associated with channel state information measurements of the serving cell.

23. The apparatus of claim 21, further comprising:
means for determining at least a portion of the eICIC data by the UE.

24. The apparatus of claim 23, wherein the means for determining at least the portion of the eICIC data by the UE further comprises:
means for determining an almost-blank signal (ABS) pattern associated with the one or more neighboring cells in the wireless communications network.

25. The apparatus of claim 24, further comprising:
means for measuring an interference pattern from the one or more neighboring cells over a period of time;
wherein the ABS pattern is based on the measured interference pattern.

26. A computer program product for wireless communication, the computer program product comprising a non-transitory computer-readable medium storing instructions executable by a processor to:
identify, by a user equipment (UE) associated with a serving cell, measurement period opportunities during a discontinuous reception 9DRX) off period, wherein the DRX off period precedes a DRX on period, and wherein the measurement period opportunities are associated with reduced interference from one or more neighboring cells in a wireless communications network;
prioritize the measurement period opportunities based at least in part on enhanced inter-cell interference coordination (eICIC) data available to the UE and a location of the measurement period relative to a start of the DRX on period; and
power up a wireless modem of the UE to perform a warm-up measurement of the serving cell during a measurement period of the prioritized measurement period opportunities.

* * * * *